(12) United States Patent
Zallocco

(10) Patent No.: US 8,539,547 B2
(45) Date of Patent: Sep. 17, 2013

(54) POLICY SELECTOR REPRESENTATION FOR FAST RETRIEVAL

(75) Inventor: Mauro Zallocco, Cary, NC (US)

(73) Assignee: Certes Networks, Inc., Pittsburgh, PA (US)

( * ) Notice: Subject to any disclaimer, the term of this patent is extended or adjusted under 35 U.S.C. 154(b) by 74 days.

(21) Appl. No.: 13/212,894

(22) Filed: Aug. 18, 2011

(65) Prior Publication Data

US 2012/0096512 A1 Apr. 19, 2012

Related U.S. Application Data

(60) Provisional application No. 61/374,882, filed on Aug. 18, 2010.

(51) Int. Cl.
*G06F 17/00* (2006.01)
(52) U.S. Cl.
USPC ............................. 726/1; 709/221; 709/223
(58) Field of Classification Search
None
See application file for complete search history.

(56) References Cited

U.S. PATENT DOCUMENTS

| | | | |
|---|---|---|---|
| 6,347,376 B1 | 2/2002 | Attwood et al. | |
| 6,715,081 B1 | 3/2004 | Attwood et al. | |
| 7,185,073 B1* | 2/2007 | Gai et al. | 709/221 |
| 7,392,241 B2 | 6/2008 | Lin et al. | |
| 2001/0042204 A1 | 11/2001 | Blaker et al. | |
| 2003/0061507 A1 | 3/2003 | Xiong et al. | |
| 2004/0049613 A1* | 3/2004 | Kim et al. | 710/52 |
| 2005/0044068 A1 | 2/2005 | Lin et al. | |
| 2006/0074899 A1 | 4/2006 | Enderwick et al. | |
| 2008/0052756 A1* | 2/2008 | Morishige et al. | 726/1 |
| 2008/0120378 A2* | 5/2008 | Smith | 709/206 |
| 2012/0117617 A1* | 5/2012 | Krupp et al. | 726/1 |

\* cited by examiner

*Primary Examiner* — Andrew L Nalven
*Assistant Examiner* — Mohammed Waliullah
(74) *Attorney, Agent, or Firm* — Hamilton, Brook, Smith & Reynolds, P.C.

(57) ABSTRACT

A method and apparatus for representing policies and searching for polices that match a packet are provided. The policies being represented and searched for include policies that overlap and policies that have "don't care" attributes.

13 Claims, 16 Drawing Sheets

POLICY SELECTOR REPRESENTATION FOR FAST RETRIEVAL

RELATED APPLICATIONS

This application claims the benefit of U.S. Provisional Application No. 61/374,882, filed on Aug. 18, 2010 and is related to U.S. Utility application entitled Policy Selector Representation for Fast Retrieval, filed Aug. 18, 2011. The entire teachings of the above applications are incorporated herein by reference.

BACKGROUND

Internet Protocol Security, or "IPSec", described in RFC4301 as published in to December 2005 as a Request for Comments (RFC) by the Internet Engineering Task Force (IETF), requires packets to be processed according to the packet's appropriate security policy. That policy determines the packet disposition, either passed through unmodified, encrypted, or dropped. Data packets need to be mapped to the appropriate policy to determine the packet's disposition.

Policies typically contain a 7-tuple attribute specification (also referred to as a configured policy selector) comprising the source IP address, source IP address mask (or source subnet mask), source port, destination IP address, destination address mask (or destination subnet mask), destination port and the protocol. A policy whose 7-tuple matches the IP packet's source IP address, source port, destination IP address, destination port, and protocol fields (referred to as the 5-tuple) under consideration, is deemed to be a matching policy for that packet.

A specific policy may identify a broad range of IP packets or may identify specific packets by defining IP address ranges, including wild card IP addresses, and IP address masks and by defining the port and/or protocol as wild card value. As such there will generally be more than one policy that matches a packet due to overlapping selectors.

RFC4301 specifies that policies must be ordered so that the appropriate policy for a given data packet can be deterministically found. For aggregation points, there can be thousands of policies, many of which are overlapping policies.

Current implementations for retrieving the appropriate policy include software and hardware assisted approaches. The software approaches include placing the policies in a linked list ordered in some fashion such as from most specific selector specification to the least specific selector specification. The search algorithm then iterates through the list until a match is found or the end of the list reached. For this algorithmic approach, the search time is proportional to the number of policy selectors configured.

Another software approach involves using hash tables. The entire 5-tuple of an IP packet (i.e., source IP address, source port, destination IP address, destination port, and protocol) is fed into a hash function producing a number (hash value) that is used as an index into a table whose entries contain a linked list of potentially matching policies. The policies in that linked list are then examined for a match with the 5-tuple. This algorithm relies on the hash function to significantly reduce the number of policies that need to be considered in the search. This approach tends to be susceptible when overlapping policies exist whereby these policies need to be added to multiple entries in the hash table or processed separately in some other fashion. Generally the better the hash function is in distributing the policies over the range of the array dimension, the longer that function takes to compute the index.

Hardware assisted approaches for policy lookup include using a ternary Content Addressable Memory (CAM) to store the policy index matching the 5-tuple. This provides fast policy lookup. The disadvantage with respect to the software approaches include the cost associated with the CAM and that the CAM is limited in the number of entries it can hold.

Techniques for searching a security policy database (SPD) in a network security environment are known. U.S. Pat. No. 6,347,376 describes an ordering of rules from most specific to least specific then dynamic rules. U.S. Pat. No. 7,392,241 describes splitting SPD into peer based SPDs. U.S. Pat. No. 6,715,081 describes an ordering of rules from most specific to least specific then dynamic rules. U.S. App. Pub. No. 20060074899 describes storing and searching a hierarchy of policies and associations thereof of particular use with IP security policies and security associations. U.S. App. Pub. No. 20050044068 describes splitting an SPD database into smaller peer based SPDs. U.S. App. Pub. No. 20030061507 and U.S. App. Pub. No. 20010042204 describes hash implementations.

SUMMARY

Embodiments include a method and corresponding apparatus for representing a policy and for searching for a policy that matches a packet. One example embodiment includes, in a packet processing device of a network, receiving a policy with policy selectors and a priority. If a subnet mask in a policy selector is not contained in any Subnet Element (SE), then a SE is created to store the subnet mask. If the priority of the policy is greater than a priority of another policy recorded in the SE, then the priority of the policy is recorded in the SE.

If an IP address in a policy selector is not contained in any IP address Tree (IT) node, then an IT node is created to store the IP address. If the SE is not storing a memory address of another IT node, then the memory address of the IT node is stored in the SE. If the SE is storing a memory address of another IT node, the then the memory address of the IT node is stored in the IT node.

If the value of the attribute policy selector is nonzero, then an Attribute Tree (AT) node is created to store the nonzero value of the attribute policy selector. If the IT node is not storing a memory address of another AT node, then the memory address of the AT node is stored in the IT node. If the IT node is storing a memory address of another AT node, then the memory address of the AT node is stored in another AT node.

If the value of the attribute policy selector is zero, indicating "don't care" about that attribute policy selector when searching for a matching policy, and the attribute policy selector is the last one to be processed of a set of attribute policy selectors, a priority node is created to store the memory address of the policy and priority of the policy.

If the IT node is not storing a memory address of the AT node, then the memory address of the priority node is store in the IT node. If the IT node is storing a memory address of the AT node, then the memory address of the priority node is store in the AT node.

Another example embodiment includes, in a packet processing device of a network, receiving an IP packet having a subject IP address and subject attribute. If a maximum priority value recorded by a Subnet Element (SE) is greater than a priority value of a policy found so far, then determine which subnet the subject IP address belongs to given a subnet mask stored in the SE is determined.

A tree of IP address Tree (IT) nodes referenced by the SE is then searched for an IT node that stores an IP address belonging to the same subnet as the subject IP address. If the IT node is found, then a tree of Attribute Tree (AT) nodes, referenced by the IT node, is searched for an AT node that stores an attribute same as the subject attribute.

If the AT node is found, a search is conducted for a priority node. If the priority node is found, then the priority value of a policy stored by the AT node is compared with the priority value of a policy stored by the priority node. The policy having the higher priority value is called a found policy. If the priority node is not found the policy stored by the AT node is the found policy. The found policy is returned Embodiments recognize that finding an appropriate policy in a minimum amount of time is imperative because it affords more time for remaining packet processing requirements for network security, resulting in higher traffic throughput for a network security system.

DETAILED DESCRIPTION OF PREFERRED EMBODIMENTS

Figure 1:
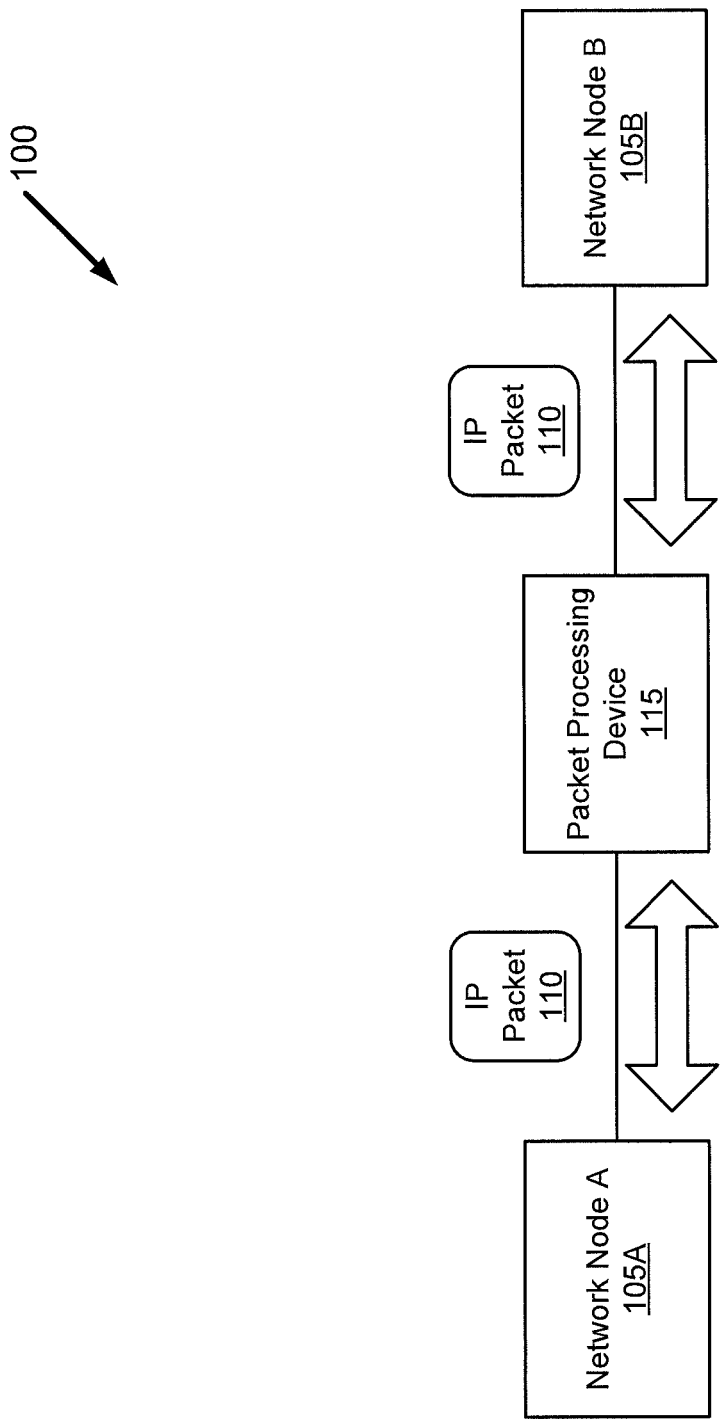
FIG. 1 is a network diagram of an example network in which the embodiments may be deployed.

FIG. 1 shows an example network 100 including network nodes 105a and 105b, generally, network nodes 105. The network nodes 105 may be, for example, personal computers, servers, and mobile devices. The network nodes 105 may represent groups of network nodes. The network nodes 105 communicate with each other using, in part, Internet Protocol packets (or IP packets) 110. The IP packets 110 may be secured using the IPsec suite of protocols. According to IPsec, the IP packets 110 are processed according to a security policy (or policy) for each packet.

In the network 100, a packet processing device 115 processes the IP packets 110 according to a security policy of each packet. The packet processing device 115 may be a physical device, such as a router, gateway, policy enforcement point or other internetworking device. The packet processing device 115 may be part of a physical device as a component, module, blade, network interface or card of that device. The packet processing device 115 may be part of (or extension of) or include an IP protocol stack running on a physical network node or other device.

To process the IP packets 110 according to a security policy of each packet, it may be convenient to represent policies matching the IP packets 110, or "matching policies" in the packet processing device 115 or in a policy store accessed by the packet processing device 115. Presented below are ways for storing in memory or otherwise representing policies that allow for fast retrieval of policies. Also presented below are ways for searching for (or looking up) a policy that matches a packet.

To allow for predictable policy retrieval, especially in the case of overlapping selectors, each policy may be assigned a priority. According to one embodiment, policies matching IP packet selectors are found, and the policy that has the highest priority is returned.

FIGS. 2A-E show an example procedure 200 for representing and processing a policy. The procedure 200 may be performed by a packet processing device, such as the packet processing device 115 of FIG. 1. As such, while the steps of the procedure 200 are described below in terms of the procedure 200 carrying out the steps, in one embodiment, it is the packet processing part of a network device—a particular machine—that performs these steps.

The procedure 200 starts at 201 and receives (205) a policy with policy selectors and a priority.

The procedure 200 determines (210) if a subnet mask in a policy selector is contained in any Subnet Element (SE). If it is not, the procedure 200 creates (215) a SE that stores the subnet mask and memory address of another SE. According to a convenient embodiment, the procedure 200 searches a list of SEs for the subnet mask being stored by another SE. The procedure 200 then adds the SE (created at 215) to the list if another SE storing the subnet mask is not found.

The procedure 200 compares (220) the priority of the policy with a priority of another policy recorded in the SE. If the priority of the policy is greater than a priority of another policy recorded in the SE, the procedure 200 then records (225) the priority of the policy in the SE. If the priority of the policy is not greater than a priority of another policy recorded in the SE, the procedure 200 then proceeds to 230.

According to one embodiment, by recording a "highest policy priority" in the SE (for example) a search of that SE (and its sub-elements) for a matching policy is terminated "early" (e.g., without searching the SE) when a policy found so far has higher priority than any policy represented by that SE (and its sub-elements).

The procedure 200 at 230 determines if an IP address in a policy selector is stored in any IP address Tree (IT) node.

Figure 2A:
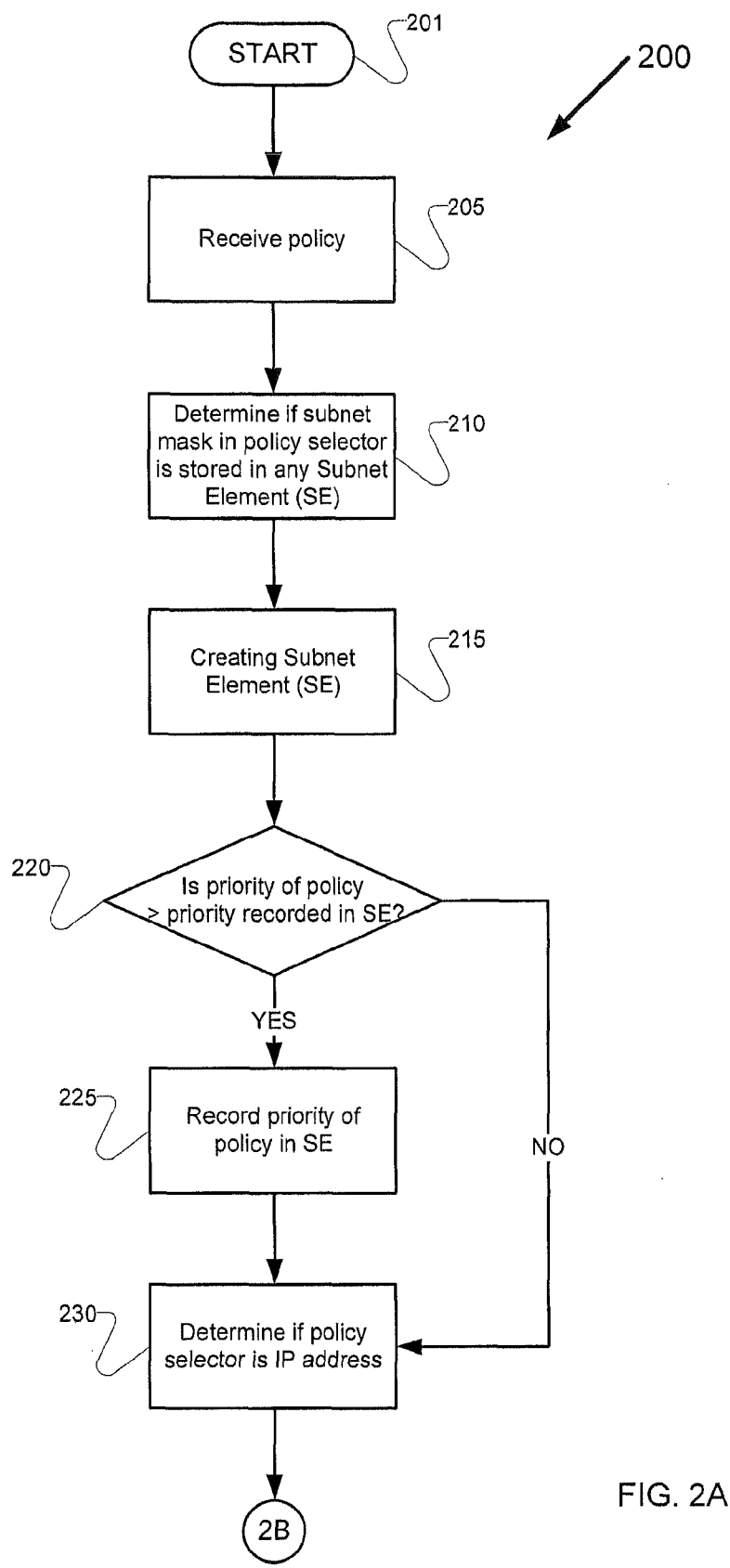
FIGS. 2A-E is a flow chart of an example procedure for representing a policy.
Figure 2B:
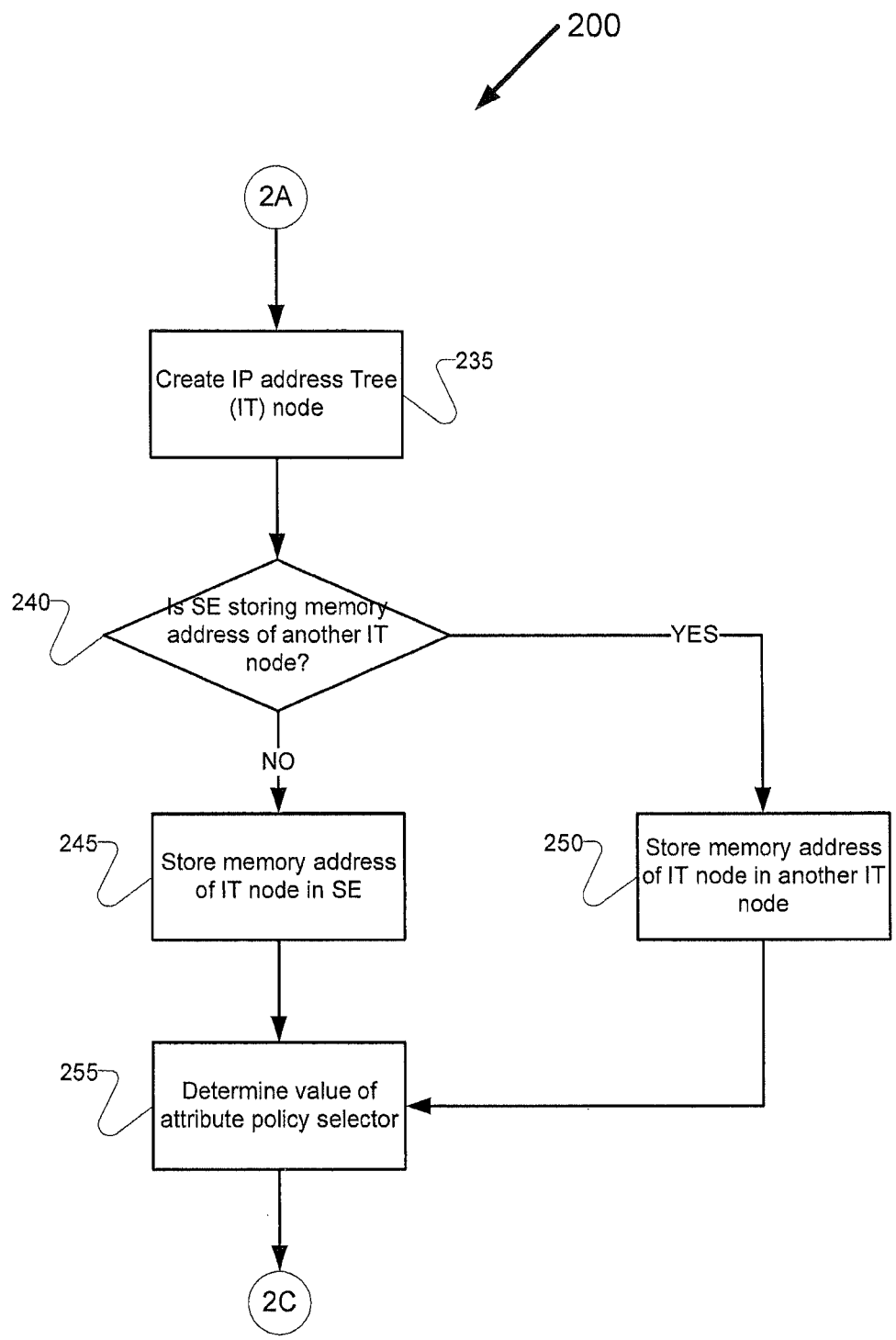

Continuing with FIG. 2B, if the procedure 200 determines (230) that an IP address in a policy selector is not stored in any IP address Tree (IT) node, then the procedure 200 creates (235) an IT node that stores the IP address and memory addresses of other IT nodes. The procedure 200 checks (240) whether the SE is storing a memory address of another IT node. If the SE is not storing a memory address of another IT node, the procedure 200 then stores (245) the memory address of the IT node in the SE. If the SE is storing a memory address of another IT node, the procedure 200 then stores (250) the memory address of the IT node in another IT node.

According to a convenient embodiment, the procedure 200 searches a tree of IT nodes for the IP address being stored by another IT node. The memory address of the root node of the tree is stored in the SE. The procedure 200 adds the IT node (created at 235) to the tree if another IT node storing the destination IP address is not found.

The procedure 200 determines (255) a value of an attribute policy selector.

Figure 2C:
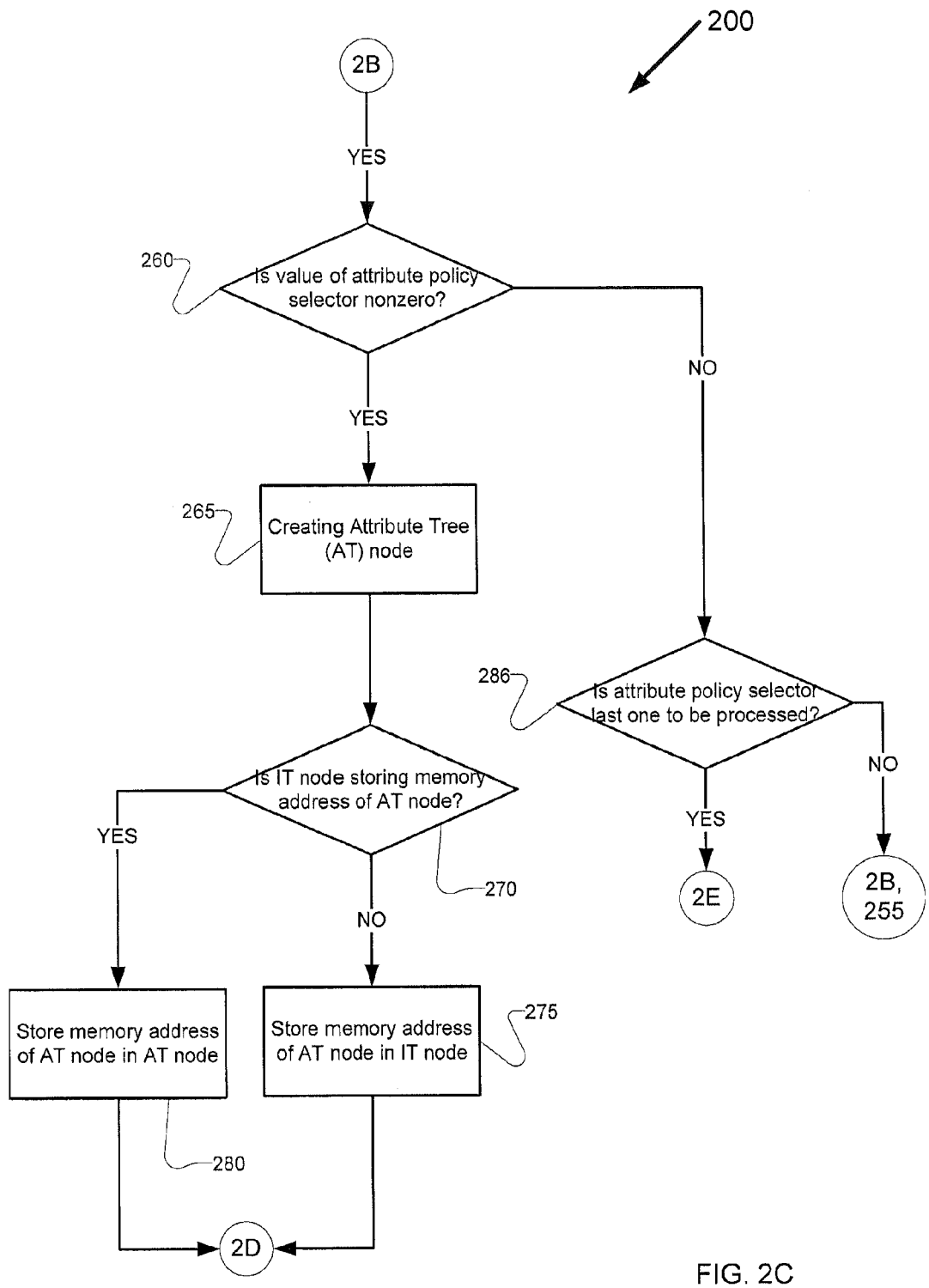

Continuing with FIG. 2C, if the procedure 200, at 260, determines the value of the attribute policy selector is nonzero, the procedure 200 then creates (265) an Attribute Tree (AT) node that stores the nonzero value of the attribute policy selector and memory addresses of other AT nodes.

According to a convenient embodiment, the procedure 200 searches a tree of AT nodes for the attribute being stored by another AT node. The memory address of the root node of the tree is stored in the IT. The procedure 200 adds the AT node (created at 265) to the tree if another AT node storing the attribute is not found.

The procedure 200 checks (270) whether the IT node is storing a memory address of another AT node. If the IT node is not storing a memory address of another AT node, the procedure 200 then stores (275) the memory address of the AT node in the IT node. If the IT node is storing a memory address of another AT node, the procedure 200 then stores (280) the memory address of the PT node in another AT node.

Figure 2D:
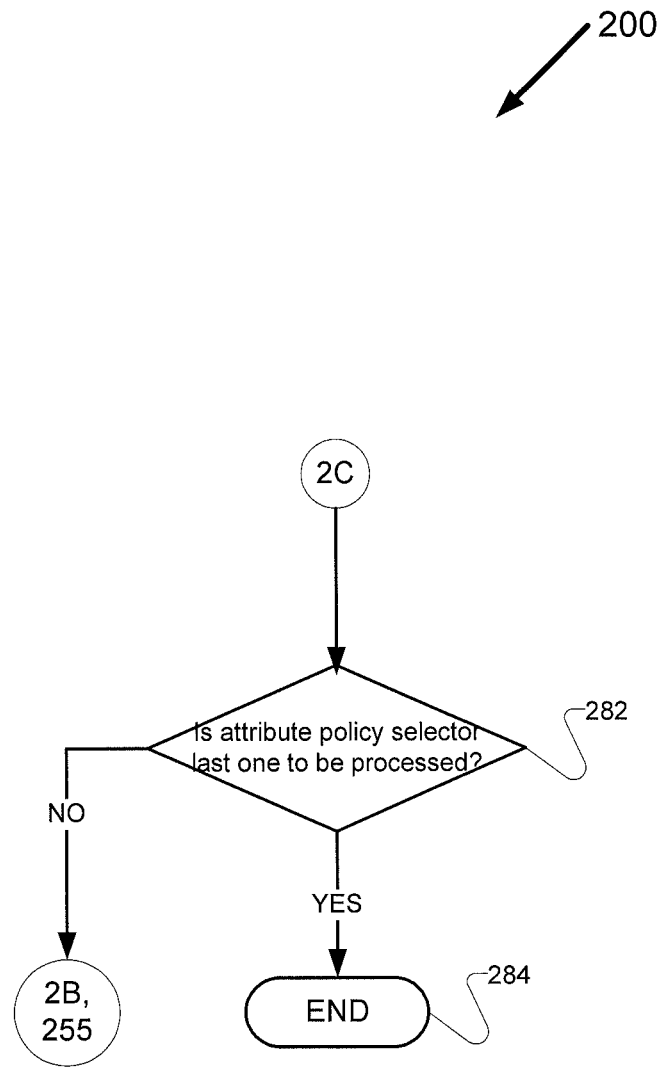

Continuing with FIG. 2D, the procedure 200 checks (282) whether there are more attribute selectors to be processed. If there is another attribute selector to be processed, the procedure 200 then returns to determine, at 255 of FIG. 2B, a value of the other attribute policy selector. If there is no attribute selector to be processed, the procedure 200 ends at 284.

Returning to FIG. 2C, if the procedure 200, at 260, determines the value of the attribute policy selector is zero, the procedure 200 then checks (286) whether the attribute policy selector is the last one to be processed of a set of attribute policy selectors. For an attribute policy selector, the value zero indicates "don't care" about that attribute policy selector when searching for a matching policy. If the attribute policy selector is not the last one to be processed, the procedure 200 then returns to determine, at 255 of FIG. 2B, a value of the other attribute policy selector.

Figure 2E:
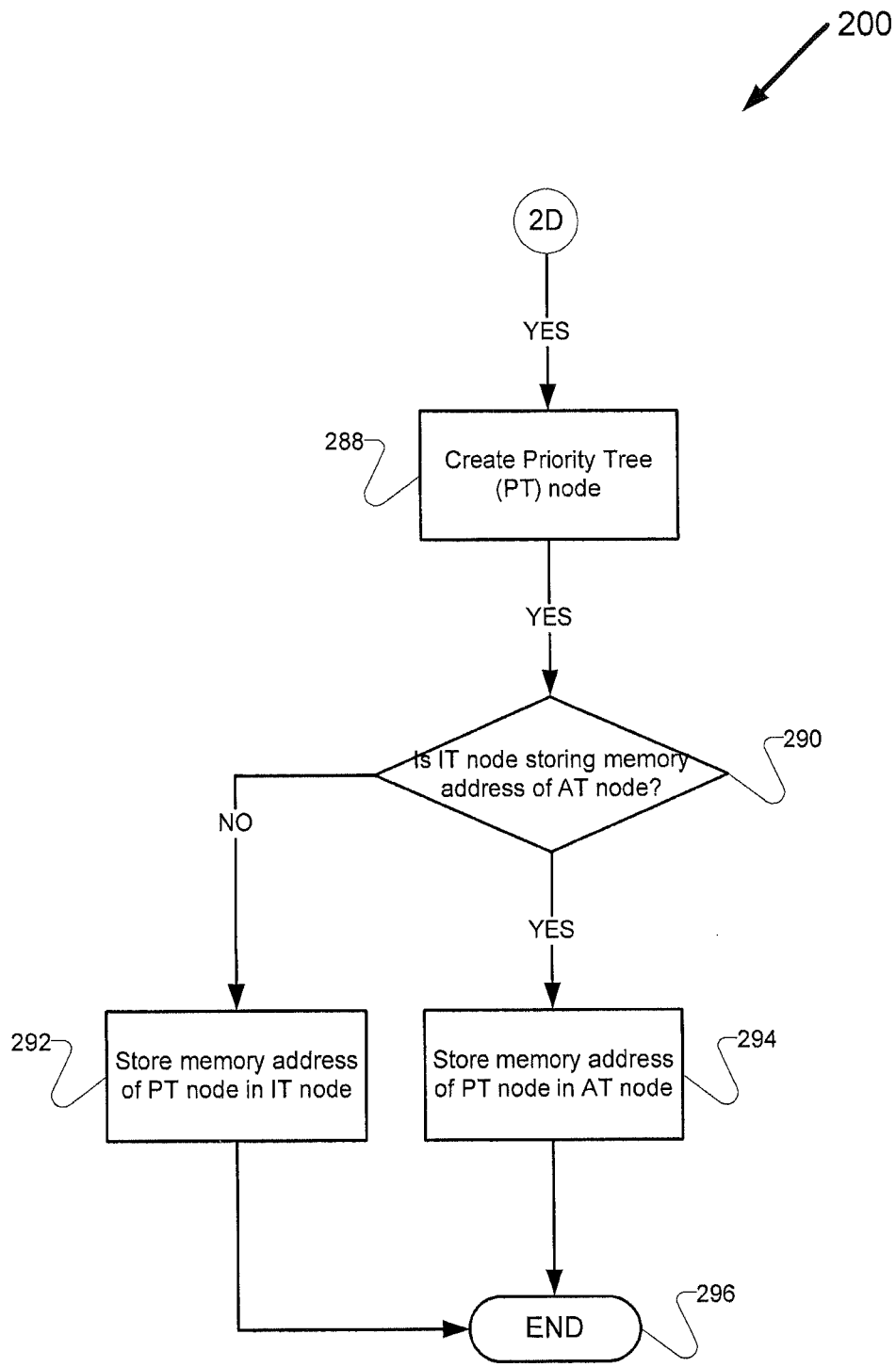

If the attribute policy selector is the last one to be processed, continuing with FIG. 2E, the procedure 200 then creates (288) a Priority Tree (PT) node (or priority node according to one embodiment) that stores the memory address of the policy and the priority of the policy. According to a convenient embodiment, the procedure 200 searches a tree of PT nodes for the attribute being stored by another PT node. The memory address of the root node of the tree is stored in the IT or AT. The procedure 200 adds the PT node (created at 288) to the tree if another PT node storing the attribute is not found.

The procedure 200 checks (290) whether the IT node is storing a memory address of an AT node. If the IT node is not storing a memory address of an AT node, the procedure 200 then stores (292) the memory address of the PT node in the IT node. If the IT node is storing a memory address of an AT node, the procedure 200 then stores (294) the memory address of the PT node in the AT node.

The procedure 200 ends at 296.

While FIGS. 2A-E shows the procedure 200 ending at 284 and 296, the procedure 200 may be a continuously running procedure. After the procedure 200 reaches and completes block 275, 280 (i.e., storing memory address of AT node that references a policy) or block 292, 294 (i.e., storing memory address of PT node that references a policy), the procedure 200 may return to decision block 205 and wait to receive another policy.

Figure 3:
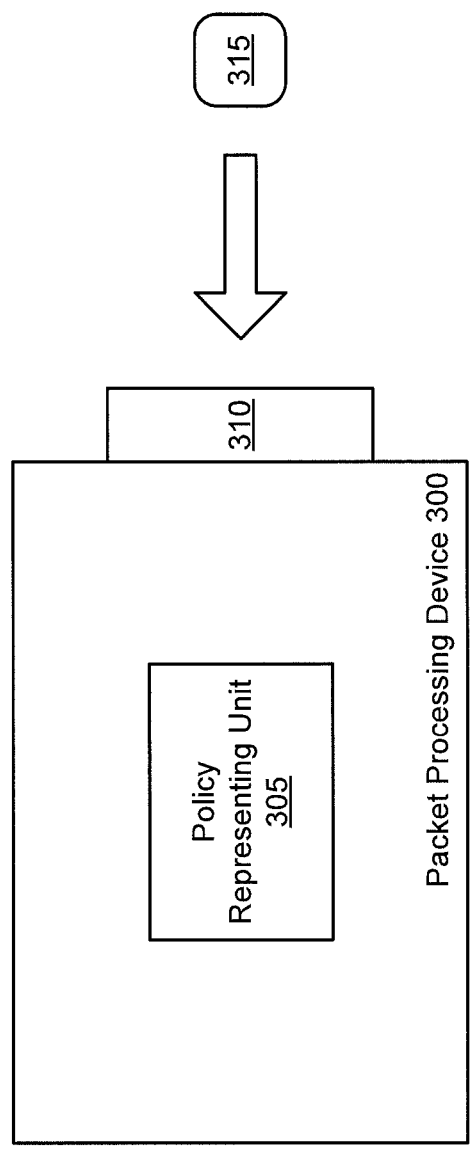
FIG. 3 is block diagram of an example packet processing device to represent a policy.

FIG. 3 shows an example packet processing device 300 to represent a policy. The device 300 includes a policy representing unit 305 communicatively coupled to an interface 310. The interface 310 is configured to receive a policy 315 with policy selectors and a priority. The policy representing unit 310 is configured to perform the procedure 200 of FIGS. 2A-E and procedures according to other embodiments.

In one embodiment the policy 315 is sent to the packet processing device 300 from a network management element as a message, signal or other indication. In another embodiment the policy 315 is entered into the packet processing device 300 by a user in an human-machine interface, such as a graphical interface or command line interface.

It may be convenient for representations of policies that are produced by the foregoing example procedure to take the form of a data structure like the one described immediately below.

Figure 4:
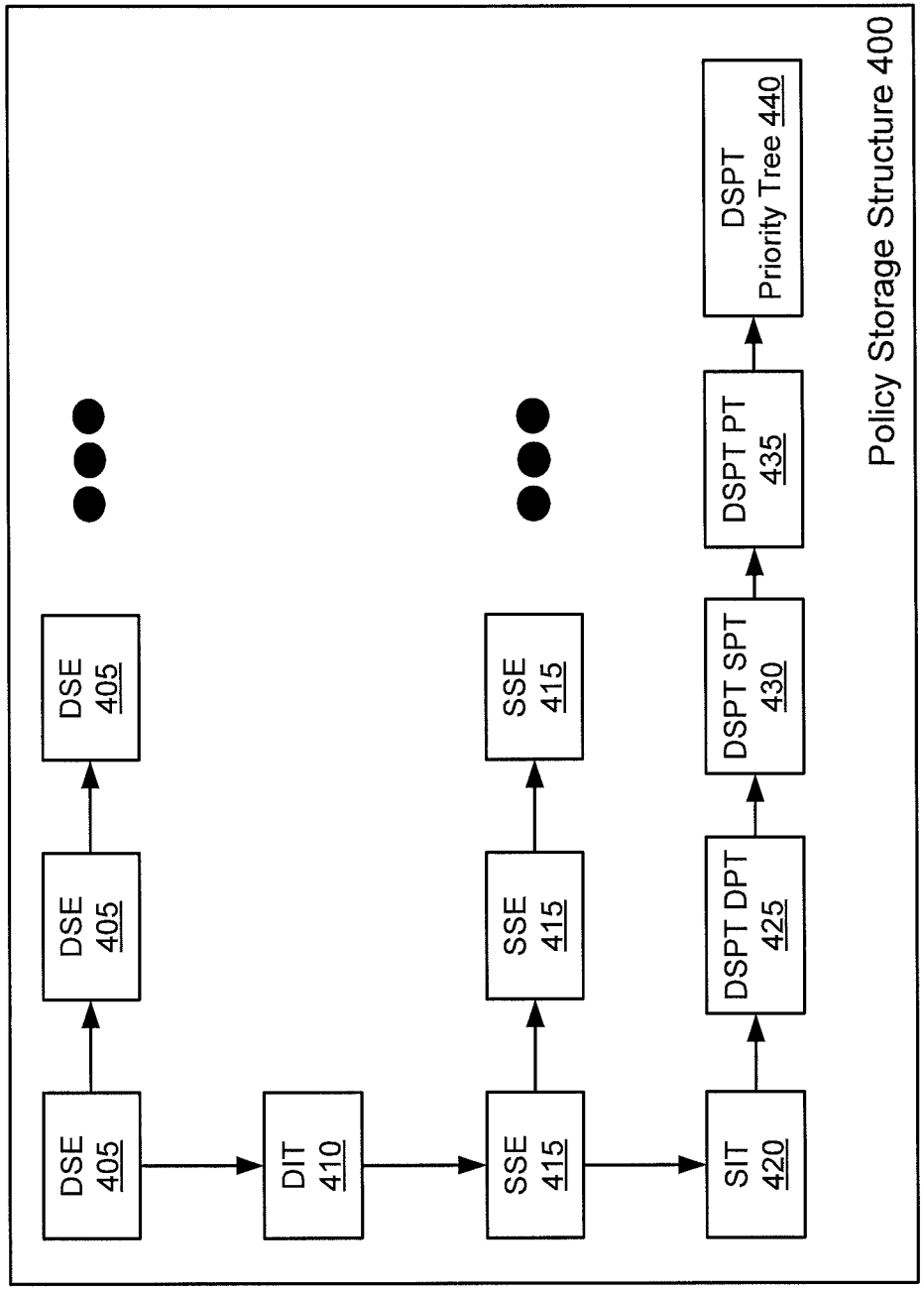
FIG. 4 is a diagram of an example policy storage structure.

FIG. 4 shows an example data structure, called policy storage structure 400, for storing policies having configured policy selectors (or 7-tuple attribute specification) of source IP address, source subnet mask, source port, destination IP address, destination subnet mask, destination port, and protocol.

The policy storage structure 400 includes at least one or more elements of a Destination Subnet Element (DSE) 405, a Destination IP address Tree Node (DIT) 410, a Source Subnet Element (SSE) 415, a Source IP address Tree Node (SIT) 420, a Destination Port Tree (DSPT DPT) 425, a Source Port Tree (DSPT SPT) 430, Protocol Tree (DSPT PT) 435, and/or a priority tree 440.

According to an embodiment, the DSE 405, DIT 410, SSE 415, SIT 420, DPT 425, SPT 430 PT 435, and priority tree 440 are interconnected as shown FIG. 4. Other arrangements are possible. For example, elements of the policy storage structure 400 may be interconnected as follows: from SSE to SIT to DSE to DIT to DPT to SPT and then to PT.

Although shown in FIG. 4, DPT 425, SPT 430 and PT 435 may or may not be present depending on a specific data item in the configured policy selectors (7-tuple attribute specification) representing "don't care," e.g., having a zero value.

In the policy storage structure 400 shown in FIG. 4:

A box represents an element instance described by the label in the box.

An arrow pointing away from an element instance A, to another element instance B, means that the element instance A has a reference to the element instance B.

A linked list is represented by an element instance with an arrow to another element instance of the same type followed by an ellipsis. For example, DSEs 405 and SSEs 415 are shown in FIG. 4 as being contained in linked lists.

An element instance representing a tree node (such as DIT 410, SIT 420, DPT 425, SPT 430, and PT 435) implicitly contains a left and right reference to another tree node but is not explicitly shown in FIG. 4.

DPT 425, SPT 430 and PT 435 are tree nodes and contain a reference to other DSPT.

Having provided (in reference to FIG. 4) an overview of the policy storage structure 400, each of the interconnected elements, DSE 405, DIT 410, SSE 415, SIT 420, DPT 425, SPT 430 PT 435, and priority tree 440 is described immediately below.

The Destination Subnet Element or DSE instance 405 represents a unique destination subnet mask component of configured policy selectors. In one embodiment, a combination of destination subnet mask and destination IP address of configured policy selectors represents a range of destination IP address, which is subject to a policy. As such, a specific policy may identify a range of IP packets or may identify a specific IP packet by its destination. In a convenient embodiment, DSEs 405 are linked together in a linked list.

The DSE instance 405 contains one or more of the following information:

Destination subnet mask.

Reference to a next DSE instance.

Reference to a DIT instance 410 (described below). The DIT instance 410 referenced by the DSE instance is the root node of a DIT tree (described below).

Maximum priority value of any policy stored under the DSE instance 405.

According to another embodiment for representing a policy, if a destination subnet mask is not represented, for example, in a list of DSEs (called a DSE list), a "new" DSE instance with the destination subnet mask is created and added, for example, to the list of DSEs.

Other information of the configured policy selectors (selector information) may be inserted into one or more structures referenced by the DSE's DIT as described below.

The Destination IP Address Tree (DIT) node 410 or instance represents a unique destination IP address contained in a configured 5-tuple whose destination subnet mask is the same as that represented by a DSE instance 405 referencing (or containing) a "root" DIT node 410 described in detail immediately below.

The DIT 410 instance contains one or more of the following information:
  Destination IP address (contained in a configured 5-tuple, for example).
  Left and right reference to another DIT instance forming, for example, an ordered binary tree ordered by the destination IP Address.
  Reference to a SSE instance (described below).

According to another embodiment for representing a policy, having found an appropriate DSE given a destination subnet mask of configured policy selectors, as described above, a binary tree search of a DIT tree (of one or more DIT instances) is undertaken, for example, to search for a node containing a destination IP address of the configured policy selectors.

The root node of the DIT tree being searched is referenced by the DSE. As such, it may be said that destination IP addresses of (or represented by) the DIT tree (including the destination IP address being searched for) have the destination subnet mask represented by the DSE.

If none is found, a "new" DIT instance with the destination IP address is created and added, for example, to the DIT tree.

Other information of the configured policy selectors (selector information) may be inserted into one or more structures referenced by the DIT's SSE as described below.

The Source Subnet Element or SSE instance 415 represents a unique source subnet mask of configured policy selectors. In one embodiment, a combination of source subnet mask and source IP address of configured policy selectors represents a range of source IP address, which is subject to a policy. As such, a specific policy may identify a range of IP packets or may identify a specific IP packet by its source. In a convenient embodiment, SSEs are linked together in a linked list.

The SSE contains one or more of the following information:
  Source subnet mask.
  Reference to a next SSE.
  Reference to a SIT instance (described below). The SIT instance being referenced by the SSE instance is the root node of a SIT tree (described below).

According to another embodiment for representing a policy, if a source subnet mask is not represented, for example, in a list of SSEs (called a SSE list), a "new" SSE instance with the source subnet mask is created and added, for example, to the list of SSEs.

Other information of the configured policy selectors (selector information) may be inserted into one or more structures referenced by the SSE's SIT as described below.

The Source IP Address Tree (SIT) node 420 or instance represents a unique source IP address contained in a configured 5-tuple whose source subnet mask is the same as that represented by the SSE referencing (or containing) a "root" SIT node described in detail immediately below.

The SIT instance contains one or more of the following information:
  Source IP address (contained in a configured 5-tuple, for example).
  Left and right reference to another SIT instance forming, for example, an ordered binary tree ordered by the source IP Address.
  Reference to a DSPT instance (described below.)

According to another embodiment for representing a policy, having found an appropriate SSE given a source subnet mask of configured policy selectors, as described above, a binary tree search of a SIT tree (of one or more SIT instances) is undertaken, for example, to search for a node containing the source IP address.

The root node of the SIT tree being searched is referenced by the SSE. As such, it may be said that source IP addresses of (or represented by) the SIT tree (including the source IP address being searched for) have the source subnet mask represented by the SSE. If none is found, a "new" SIT instance with the source IP address is created and added, for example, to the SIT tree.

Other information of the configured policy selectors (selector information) may be inserted into one or more structures referenced by the SIT's DSPT as described below.

A Base Tree or DSPT is a declaration that can represent a Destination Port Tree (DPT), a Source Port Tree (SPT), and/or a Protocol Tree (PT) as described below. DSPT instance represents, for example, a binary tree node containing a data item, which is used for ordering the binary tree. The specifics of the data item are defined by the specific "type" of Base Tree (i.e., DPT, SPT or PT). A Base Tree instance contains one or more of the following information:
  A left and right reference to another base tree node.
  An identifier (id) indicating which of DPT, SPT or PT is being represented.
  A data item specific to which of DPT, SPT or PT is being represented used to order the tree
  A reference to the policy for the matching IP packet.
  A reference to an alternate base tree. This forms a linked list of DSPTs, which is further described below in reference to DSPT insertion.

The Destination Port Tree or DPT node 425 is an instance of DSPT with id set to indicate DPT and the data item being a destination port of configured policy selectors (also called a "7-tuple destination port").

The Source Port Tree or SPT node 430 is an instance of DSPT with id set to indicate SPT and the data item being a source port of configured policy selectors (also called a "7-tuple source port").

The Protocol Tree or PT node 435 is an instance of DSPT with id set to indicate PT and the data item being a protocol of configured policy selectors (also called a "7-tuple protocol").

Priority Tree (or priority node) 440 is an instance of DSPT with id set to indicate Priority Tree and the data item being the priority of the policy.

According to another embodiment for representing a policy, having found an appropriate SIT when given a source IP address of configured policy selectors, as described above, the 7-tuple items, namely, a destination port, source port and protocol, are examined in turn as described immediately below.

If the destination port is not designated as a "don't care," (e.g., destination port value is non-zero) then a DSPT instance with DPT designation is searched for in, for example, the SIT's DSPT linked list. If not found, a "new" DSPT instance with DPT designation is created and placed in, for example, the SIT's DSPT linked list. The DTP instance found or created is the root node for a destination port binary (DPT) tree.

A binary tree search of the DPT 425 is undertaken, for example, to search for a node containing the destination port value of configured policy selectors. If not found, then a DPT instance is created with the destination port value and inserted into the DPT root tree.

The foregoing search of the DPT 425 may be described in reference to the following pseudo code:

```
var dspt = SIT.dspt
if 7-tuple.destination port is not don't care value
    var dspt1 = find dspt with DPT designation in list dspt.
    If not found then dspt1 = create new DPT and insert into dspt
    alternate list.
    var dpt = find dspt1.destination port in dspt1 binary tree
    If not found dpt = create new DPT containing this destination port
and insert into dspt1 tree.
    dspt = dpt
end.
    A search of the SPT 435 may be described in reference to the
following pseudo code, which carries forward the dspt variable defined
above:
if 7-tuple.source port is not don't care value
    var dspt1 = find dspt with SPT designation in list dspt.
    If not found then dspt1 = create new SPT and insert into dspt
    alternate list.
    var spt = find dspt1.source port in dspt1 binary tree
    If not found spt = create new SPT containing this source port and
insert into dspt1 tree.
    dspt = spt
end.
    A search of the PT 440 may be described in reference to the
following pseudo code, which carries forward the dspt variable defined
above:
if 7-tuple.protocol is not don't care value
    var dspt1 = find dspt with PT designation in list dspt.
    If not found then dspt1 = create new PT and insert into dspt
    alternate list.
    var pt = find dspt1.protocol in dspt1 binary tree
    If not found pt = create new PT containing this protocol and insert
    into dspt1 tree.
    dspt = pt
else
    var dspt1 = find dspt with Priority Tree designation in list dspt.
    If not found then dspt1 = create new Priority Tree and insert
into dspt alternate list.
    var pt = find dspt1.priority in dspt1 binary tree
    If not found pt = create new Priority Tree containing this priority and
insert into dspt1 tree.
    dspt = pt
end.
```

As a final step in the aforementioned embodiment, a policy, which defines the disposition of an IP packet, matching the criteria defined by the configured policy selector is assigned, for example, to a dspt.policy field. A priority associated with the policy is examined to determine if the priority is greater than that stored in (or indicated by) the DSE. If so, then the priority of this policy is copied into maximum priority value of the DSE. In other words, the maximum priority value of the DSE is updated with the value of highest priority policy.

Having described above the embodiments for representing a policy, examples (with values) demonstrating their operation are presented below.

Figure 5:
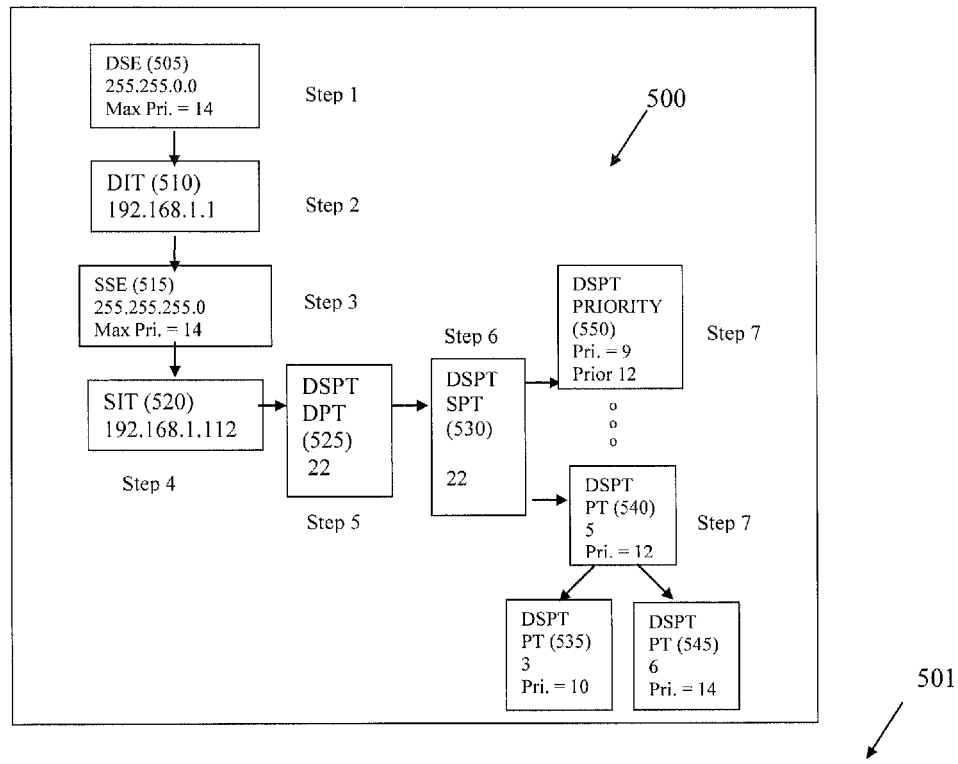
FIGS. 5-7 are diagrams of example representations of polices.

Using policy representations 500 and policy definitions 501 shown in FIG. 5, the following examples demonstrate how policies, including a policy with a "don't care" definition for a protocol field (or attribute) are represented. In FIG. 5 the labels "step 1" through "step 8" correspond to the steps that are enumerated below. Starting with an empty policy representation, policies 1, 2, 3 and 4 of policy definitions 501 are inserted as follows.

Inserting Policy Number 1:

Step 1. Search for DSE corresponding to 255.255.0.0. Not found, create a DSE (505) corresponding to 255.255.0.0.

Step 2. Using the DSE (505) created in step 1, search for DIT corresponding to 192.168.1.1. Not found, create a DIT instance (510) for 192.168.1.1 and insert it in the DSE (505).

Step 3. Using the DIT (510) created in step 2, search for SSE corresponding to 255.255.255.0. Not found, create a SSE (515) instance corresponding to 255.255.255.0 and insert it in the DIT (510).

Step 4. Using the SSE (515) created in step 3, search for SIT corresponding to 192.168.1.112. Not found, create a SIT (520) instance corresponding to 192.168.1.112 and insert it in the SSE (515).

Step 5. Using the SIT (520) created in step 4, search for DSPT of type DPT. Not found, create a DSPT of type DPT (525), set its data item to 22 and insert the DSPT of type DPT (525) into the SIT (520).

Step 6. Using the DSPT of type DPT (525) created in step 5, search for DSPT of type SPT. Not found, create a DSPT of type SPT (530), set its data item to 22 and insert the DSPT of type SPT (530) into the DSPT of type DPT (525) from step 5.

Step 7. Using the DSPT of type SPT (530) from step 6, search for DSPT of type PT. Not found, create a DSPT of type PT (535), set its data item to 3, the priority field to 10 and insert the DSPT of type PT (535) into the DSPT of type SPT (530) from step 6.

Step 8. Set max priority to 10 in the SSE and DSE

Inserting Policy Number 2:

1. Search for DSE corresponding to 255.255.0.0. Found DSE (505), proceed with step 2.

2. Using the DSE (505) found in step 1, search for DIT corresponding to 192.168.1.1. Found DIT (510), proceed with step 3.

3. Using the DIT (510) found in step 2, search for SSE corresponding to 255.255.255.0. Found SSE (515), proceed with step 4.

4. Using the SSE (515) found in step 3, search for SIT corresponding to 192.168.1.112. Found SIT (520), proceed with step 5.

5. Using the SIT (520) found in step 4, search for DSPT of type DPT. Found DSPT of type DPT (525), proceed with step 6.

6. Using the DSPT of type DPT (525) found in step 5, search for DSPT of type SPT. Found DSPT of type SPT (530), proceed with step 7.

7. Using the DSPT of type SPT (530) found in step 6, search for DSPT of type PT. Found DSPT of type PT (535). Using the found DSPT of type PT (535), search for protocol equal to 5. Not found. Create a DSPT of type PT (540), set its data item to 5, the priority field to 12 and insert the created DSPT of type PT (540) into the DSPT of type PT (535) found in this step. The insertion is done so that PT remains balanced, for example.

8. Set max priority to 12 in the SSE and DSE.

Inserting Policy Number 3:

1. Search for DSE corresponding to 255.255.0.0. Found DSE (505), proceed with step 2.

2. Using the DSE (505) found in step 1, search for DIT corresponding to 192.168.1.1. Found DIT (510), proceed with step 3.

3. Using the DIT (510) found in step 2, search for SSE corresponding to 255.255.255.0. Found SSE (515), proceed with step 4.

4. Using the SSE (515) found in step 3, search for SIT corresponding to 192.168.1.112. Found SIT (520), proceed with step 5.

5. Using the SIT (520) found in step 4, search for DSPT of type DPT. Found DSPT of type DPT (525), proceed with step 6.

6. Using the DSPT of type DPT (525) found in step 5, search for DSPT of type SPT. Found DSPT of type SPT (530), proceed with step 7.

7. Using the DSPT of type SPT (530) found in step 6, search for DSPT of type PT. Found DSPT of type PT (535). Using the found DSPT of type PT (535), search the PT for protocol equal to 6. Not found. Create a DSPT of type PT (545), set its data item to 6, the priority field to 14 and insert the created DSPT of type PT (545) into the DSPT of type PT (535) found in this step. The insertion is done so that PT remains balanced, for example.

8. Set max priority to 14 in the SSE and DSE

Inserting policy number 4, which contains a "don't care" for the protocol attribute:

1. Search for DSE corresponding to 255.255.0.0. Found DSE 505, proceed with step 2.

2. Using the DSE 505 found in step 1, search for DIT corresponding to 192.168.1.1. Found DIT (510), proceed with step 3.

3. Using the DIT (510) found in step 2, search for SSE corresponding to 255.255.255.0. Found SSE (515), proceed with step 4.

4. Using the SSE (515) found in step 3, search for SIT corresponding to 192.168.1.112. Found SIT (520), proceed with step 5.

5. Using the SIT (520) found in step 4, search for DSPT of type DPT. Found, proceed with step 6.

6. Using the DSPT of type DPT (525) found in step 5, search for DSPT of type SPT. Found DSPT of type SPT (530), proceed with step 7.

7. Because protocol is "don't care" (e.g., set to 0), using the DSPT of type SPT (530) found in step 6, search for DSPT of type Priority. Not found. Create a DSPT of type Priority (550), set its priority field to 9 and insert the created DSPT of type Priority (550) into the DSPT of type SPT (530) found in step 6

Figure 6:
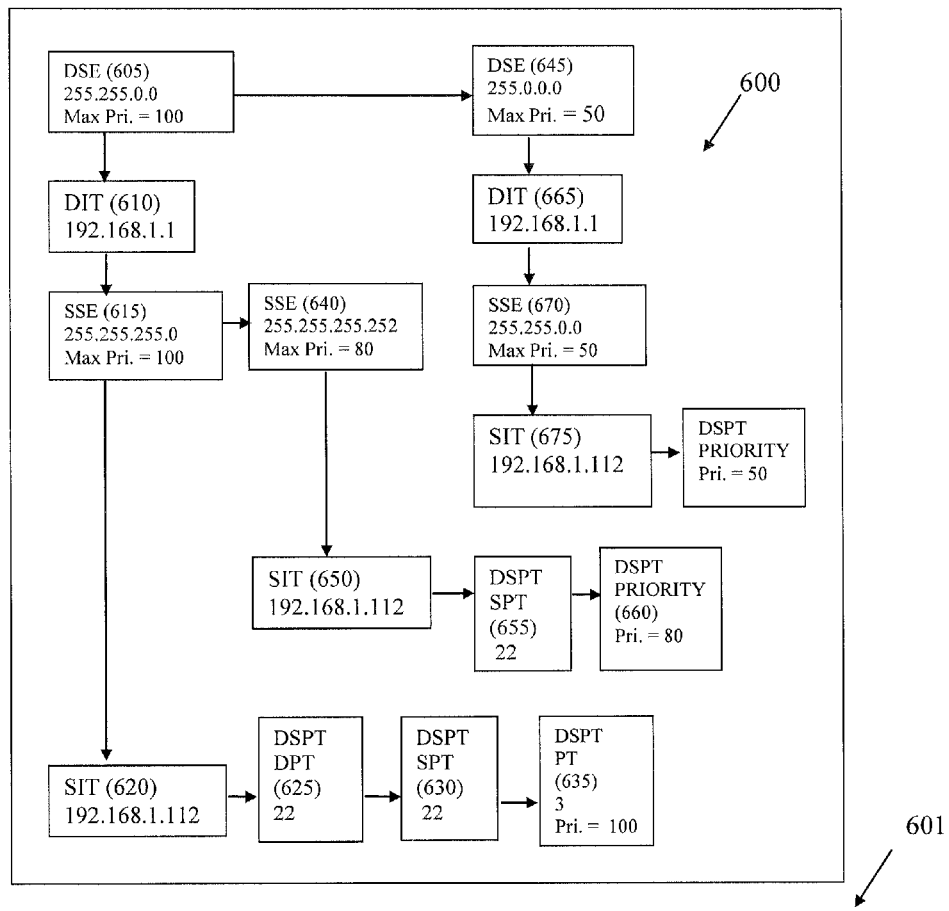

FIG. 6 shows policy representations 600 of policy definitions 601. The policy definitions 601 being represented have multiple different masks for the same IP address and "don't care" (e.g., value of 0) for source port, destination port and protocol attributes.

Figure 7:
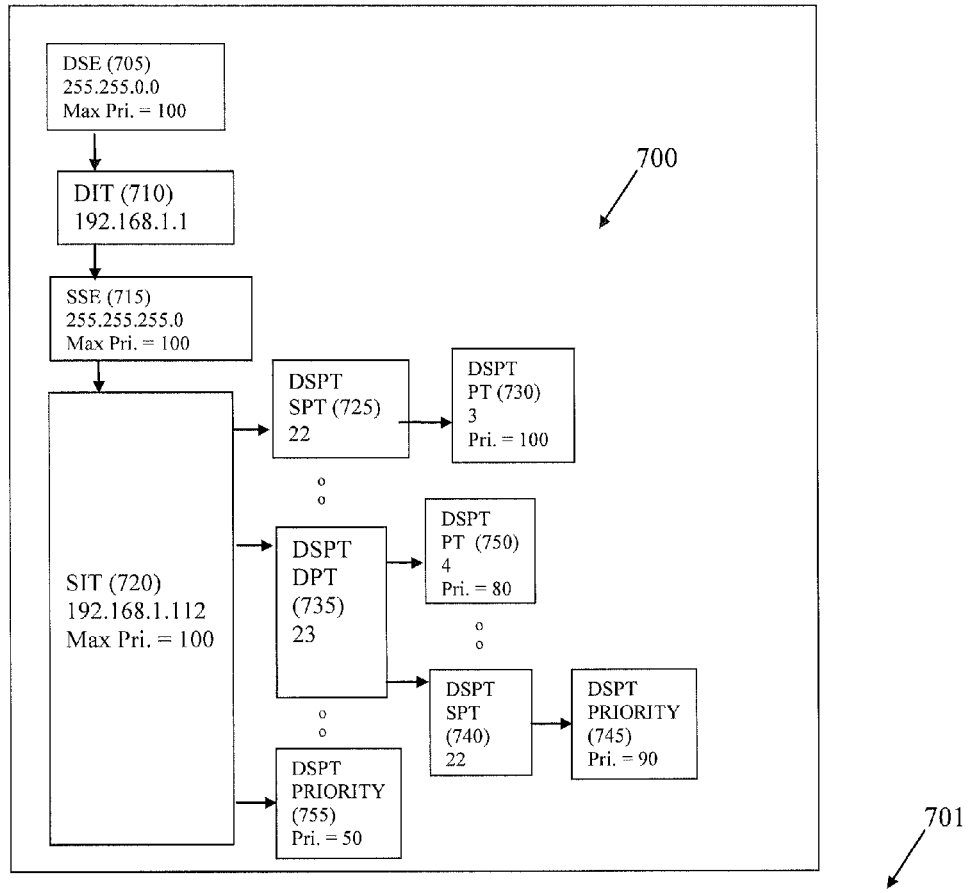

Using policy representations 700 and policy definitions 701 shown in FIG. 7, the following examples demonstrate how policies that have various "don't care" attributes are represented. Starting with an empty policy representation, policies 1, 2, 3 and 4 of Table 3 are inserted as follows.

Inserting Policy Number 1:

1. Search for DSE corresponding to 255.255.0.0. Not found, create a DSE (705) corresponding to 255.255.0.0.

2. Using the DSE (705) created in step 1, search for DIT corresponding to 192.168.1.1. Not found, create a DIT instance (710) for 192.168.1.1 and insert it in the DSE (705).

3. Using the DIT instance (710) created in step 2, search for SSE corresponding to 255.255.255.0. Not found, create a SSE instance (715) corresponding to 255.255.255.0 and insert it in the DIT instance (710).

4. Using the SSE instance (715) created in step 3, search for SIT corresponding to 192.168.1.112. Not found, create a SIT instance (720) corresponding to 192.168.1.112 and insert it the SSE instance (715).

5. Because the destination port in this policy is "don't care," proceed to process the source port definition. Using the SIT instance (720) created in step 4, search for DSPT of type SPT. Not found, create a DSPT of type SPT (725), set its data item to 22 and insert the DSPT of type SPT (725) into the SIT instance (720).

6. Using the DSPT of type SPT (725) created in step 5, search for DSPT of type PT. Not found, create a DSPT of type PT (730), set its data item to 3, the priority field to 100 and insert the DSPT of type PT (730) into the DSPT of type SPT (725) from step 6.

7. Set max priority to 100 in the SSE and DSE

Inserting Policy Number 2:

1. Search for DSE corresponding to 255.255.0.0. Found DSE (705), proceed with step 2.

2. Using the DSE (705) found in step 1, search for DIT corresponding to 192.168.1.1. Found DIT instance (710), proceed with step 3.

3. Using the DIT instance (710) found in step 2, search for SSE corresponding to 255.255.255.0. Found SSE instance (715), proceed with next step.

4. Using the SSE instance (715) found in step 3, search for SIT corresponding to 192.168.1.112. Found SIT instance (720), proceed with next step.

5. Using SIT instance (720) found in step 4, search for DSPT of type DPT. Not found, create a DSPT of type DPT (735), set its data item to 23 and insert the DSPT of type DPT (735) into the SIT instance (720).

6. Using DSPT of type DPT (735) created in step 5, search for DSPT of type SPT. Not found, create a DSPT of type SPT (740), set its data item to 22, and insert the DSPT of type SPT (740) into the DSPT of type DPT (735) created in step 5.

7. Because the protocol in policy number 2 is "don't care," search for DSPT of type Priority. Not found, create a DSPT of type Priority (745), set its data item to 90 and insert the DSPT of type Priority (745) into the DSPT of type SPT (740) created in step 6.

Inserting Policy Number 3:

1. Search for DSE corresponding to 255.255.0.0. Found DSE (705), proceed with step 2.

2. Using the DSE (705) found in step 1, search for DIT corresponding to 192.168.1.1. Found DIT instance (710), proceed with step 3.

3. Using the DIT instance (710) found in step 2, search for SSE corresponding to 255.255.255.0. Found SSE instance (715), proceed with next step.

4. Using the SSE instance (715) found in step 3, search for SIT corresponding to 192.168.1.112. Found SIT instance (720), proceed with next step.

5. Using SIT instance (720) found in step 4, search for DSPT of type DPT. Found DSPT of type DPT (735), proceed with the next step.

6. Because source port in policy number 3 is "don't care," proceed with the next field (or attribute) of interest, which is the protocol field (or attribute). Using DSPT of type DPT (735) found in step 5, search for DSPT of type PT. Not found, create a DSPT of type PT (750), set its data item to 4, priority to 80 and insert the DSPT of type PT (750) into the DSPT of type DPT (735) found in step 5.

Inserting Policy Number 4:

1. Search for DSE corresponding to 255.255.0.0. Found DSE (705), proceed with step 2.

2. Using the DSE (705) found in step 1, search for DIT corresponding to 192.168.1.1. Found DIT instance (710), proceed with step 3.

3. Using the DIT instance (710) found in step 2, search for SSE corresponding to 255.255.255.0. Found SSE instance (715), proceed with next step.

4. Using the SSE instance (715) found in step 3, search for SIT corresponding to 192.168.1.112. Found SIT instance (720), proceed with next step.

5. Because destination port in policy number 4 is "don't care," proceed with the next field of interest, which is the source port field.

6. Because source port in policy number 4 is "don't care," proceed with the next field of interest, which is the protocol field.

7. Because protocol in policy number 4 is "don't care," search for DSPT of type Priority. Not found, create a DSPT of type Priority (755), set its data item to 50 and insert the DSPT of type Priority (755) into the SIT instance (720) found in step 4.

Having described embodiments for representing polices and provided examples demonstrating their operation, embodiments for searching for polices that match packets, or matching polices, are described immediately below.

For a particular IP packet under consideration, a lookup procedure or method uses the IP address and attribute of the IP packet to search for a policy, which describes the disposition of the IP packet. There may be more than one policy matching the IP address and attribute of the IP packet. A lookup procedure, according to one embodiment, finds the policy whose priority is the highest.

Figure 8A:
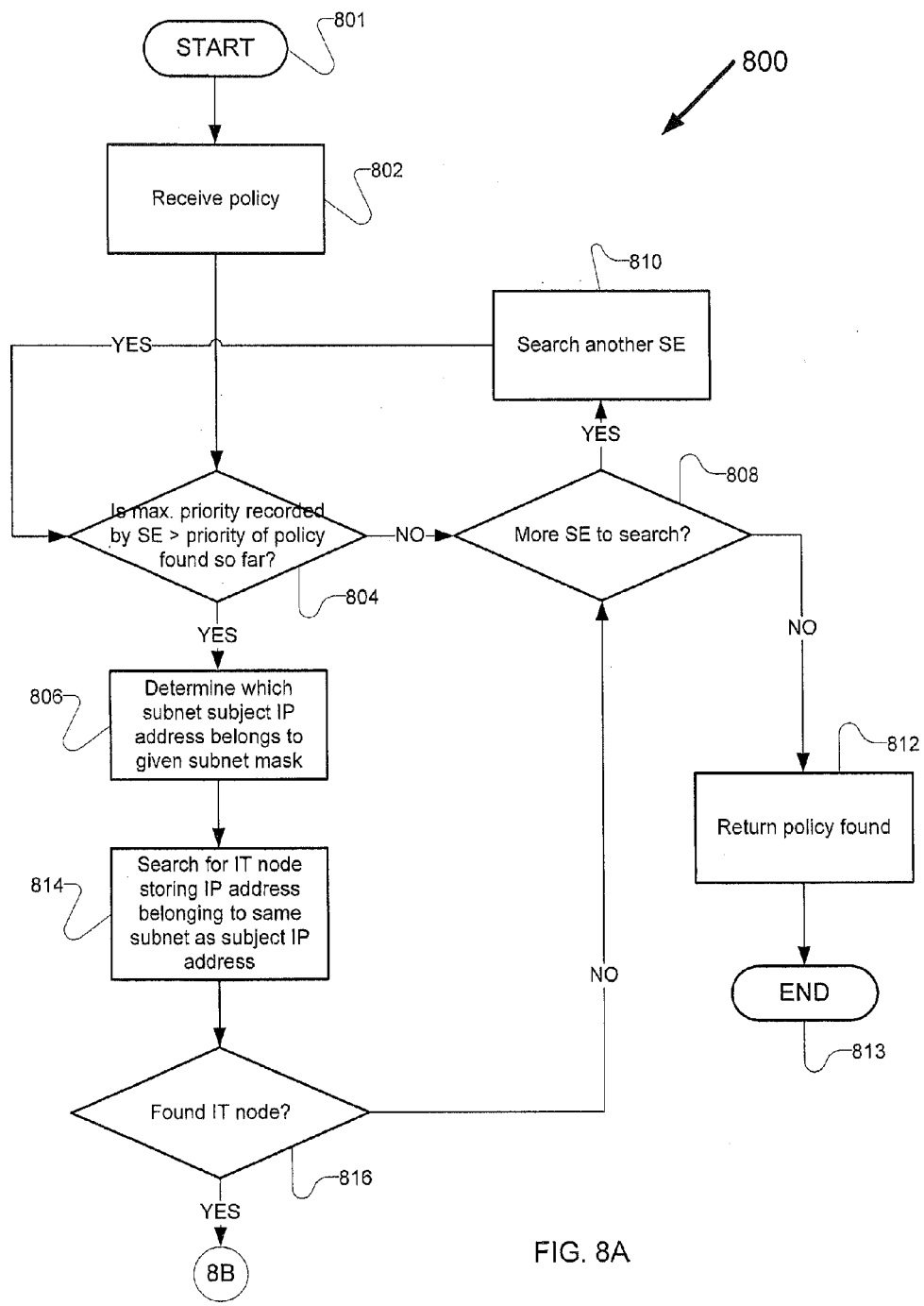
FIGS. 8A-C is a flow chart of an example procedure for searching for a policy that matches a packet.
Figure 8B:
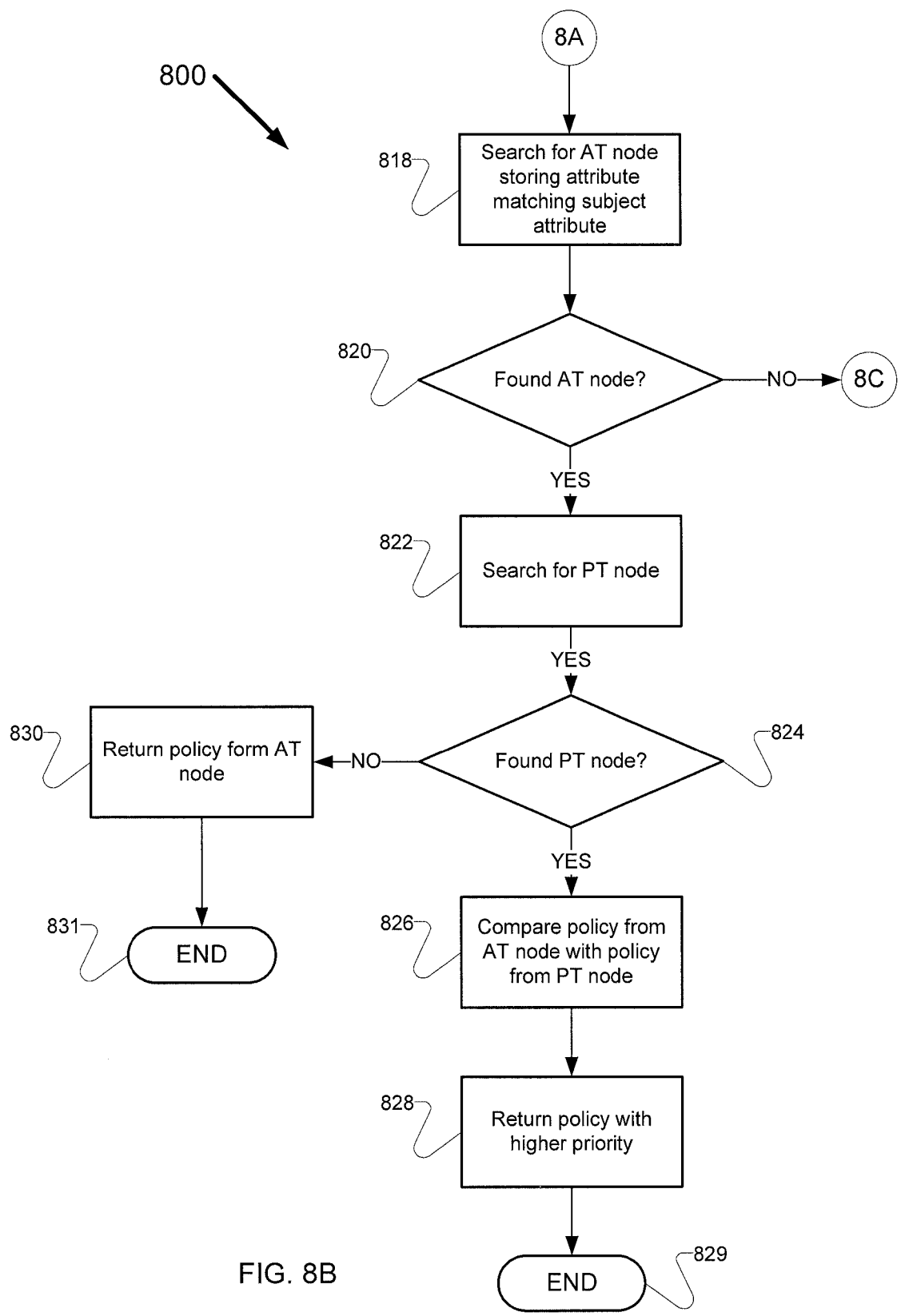
Figure 8C:
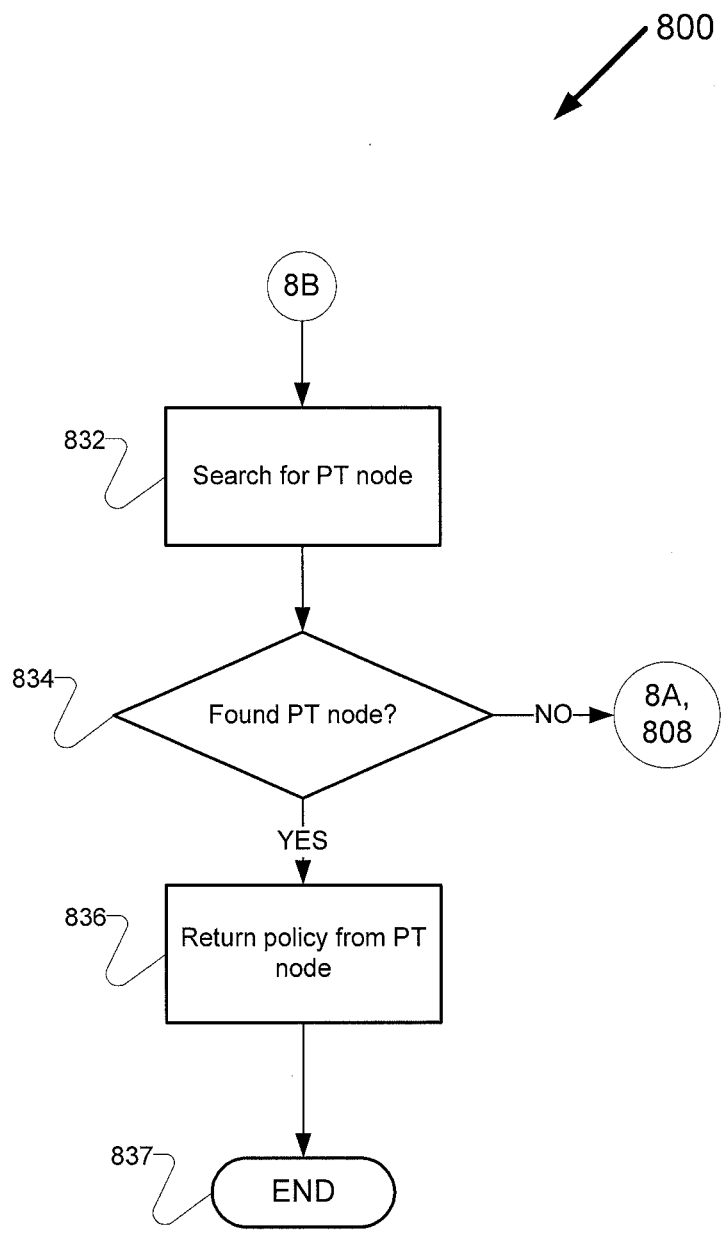

FIGS. 8A-C show an example procedure 800 for searching for a policy that matches an IP packet. The procedure 800 may carried out by a packet processing device, such as the packet processing device 115 of FIG. 1. As such, while the steps of the procedure 800 are described below in terms of the procedure 800 carrying out the steps, in one embodiment, it is the packet processing part of a network device—a particular machine—that performs these steps.

The procedure 800 starts at 801 and receives (802) a policy having a subject IP address and subject attribute.

The procedure 800 determines if maximum priority value recorded by SE is greater than a priority value of a policy found so far. If at 804, the maximum priority value recorded by the SE is greater than the priority value of the policy found so far, then the procedure 800 determines (806) which subnet the subject IP address belongs to given a subnet mask stored in the SE.

If at 804, the maximum priority value recorded by the SE is not greater than the priority value of the policy found so far, then the procedure 800 determines (808) whether there is another SE to search and, if there is, searches (810) the other SE and continues at 804. If there is no other SE to search, then the procedure 800 returns (812) "policy found" and the procedure 800 ends at 813.

The procedure 800 searches (814) a tree of IP address Tree (IT) nodes referenced by the SE for an IT node that stores an IP address belonging to the same subnet as the subject IP address. If at 816, the procedure 800 does not find the IT node, the procedure 800 determines (808) whether there is another SE to search and, if there is, searches (810) the other SE and continues at 804. If there is no other SE to search, then the procedure 800 returns (812) "policy found" and the procedure 800 ends at 813.

If at 816, the procedure 800 finds the IT node, continuing with FIG. 8B, the procedure 800 then searches (818) a tree of Attribute Tree (AT) nodes, referenced by the IT node, for an AT node that stores an attribute matching the subject attribute.

If at 820, the procedure 800 finds the AT node, the procedure 800 then searches (822) for a priority node. The priority node is not associated with any attribute of the IP packet but may exist because there may be a policy definition that includes a "don't care" value.

If at 824, the procedure 800 finds the priority node, the procedure 800 then compares (826) the priority value of a policy stored by the AT node with the priority value of a policy stored by the priority node. The policy having the higher priority value of the two is called a found policy. The procedure 800 returns (828) the found policy and ends at 829.

Returning to 824, if the procedure 800 does not find the priority node, the procedure 800 returns (830) a policy stored by the AT node as the found policy and ends at 831.

Returning to 820, if the procedure 800 does not find the AT node, continuing with FIG. 8C, the procedure 800 then searches (832) for a priority node. If at 834, the procedure 800 finds the priority node, the procedure 800 then returns (836) a policy stored by the priority node as a found policy and ends at 837.

If at 834, the procedure 800 does not find the priority node, the procedure 800 returns to 808 of FIG. 8A and determines (808) whether there is another SE to search. If there is, the procedure 800 searches (810) the other SE and continues at 804. If there is no other SE to search, then the procedure 800 returns (812) "policy found" and the procedure 800 ends at 813.

Another example lookup procedure, according to another embodiment, given the 5-tuple of an IP packet, for each DSE in a policy storage structure (e.g., the policy storage structure 400 of FIG. 4) having a maximum priority value greater than or equal to a priority value of a found policy, the procedure searches a tree of DITs referenced by the DSE for the destination IP address of the IP packet. If the procedure finds a DIT having the destination IP address, the procedure then searches a list of SSEs referenced by the DIT.

If the procedure does not find a DIT having the destination IP address under the DSE, its tries searching another DSE also having a maximum priority value greater than or equal to the priority value of the found policy. The procedure continues searching all DSEs having a maximum priority value greater than or equal to the priority value of the found policy until a match is found or there are no more such DSEs to search. The procedure does not try to search DSEs having a maximum priority value less than the priority value of the found policy.

For each SSE in the list of SSEs, the procedure searches a tree of SITs referenced by the SSE for the source IP address of the IP packet. If the procedure finds a SIT having the source IP address, the procedure returns a policy associated with the SIT as the found policy matching the IP packet.

Another example lookup procedure, according to a convenient embodiment, is described by the following pseudo code:

```
var foundPolicy = default policy
For each DSE in turn,
    if foundPolicy.priority is less than DSE.maximumPriority
    search the DSE's DIT tree for a match on the destination IP
    address in the 5-tuple.
    If found, for each SSE in the DIT's SSE list
        search the SSE's SIT tree for a match on the source IP
        address in the 5-tuple.
        If found
            var policy = traverse the SIT's DSPT searching for the
            policy
            If policy's priority is greater than foundPolicy's
            priority
                foundPolicy = policy
            end
        end
end
```

-continued

```
      end
end
        The example lookup procedure returns "foundPolicy," which is
the desired policy, i.e., the policy matching the packet's 5-tuple.
        According to a convenient embodiment, the following pseudo
code describes an example procedure for traversing a DSPT (e.g., DPT,
SPT, and PT) to search for a policy, called traverseDSPT:
static var foundPolicy = default policy
For this DSPT and all the DSPT in the alternate linked list
        if the DSPT is a DPT, lookFor = 5-tuple.destination port
        else if DSPT is a SPT, lookFor = 5-tuple.source port
        else if DSPT is a PT, lookFor = 5-tuple.protocol
        end.
        var dspt = find lookFor in DSPT's binary tree.
        If found
              var policy = dspt.policy
              if policy.priority > foundPolicy.priority
                    foundPolicy = policy
              end
              traverseDSPT(dspt.alternate)
        end
end
return foundPolicy
```

Figure 9:
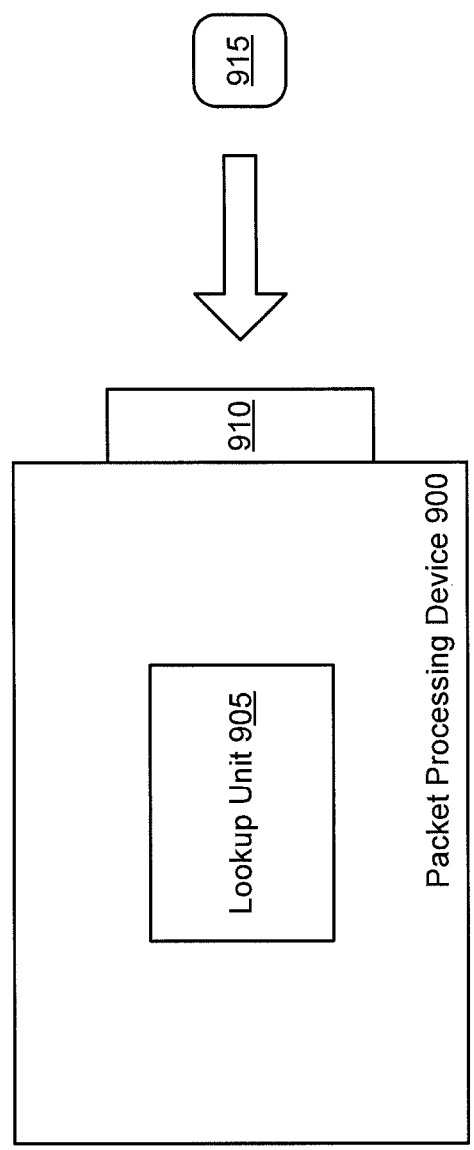
FIG. 9 is block diagram of an example packet processing device to search for a policy that matches a packet.

FIG. 9 shows an example packet processing device 900 to search for a policy that matches a packet. The device 900 includes a lookup unit 905 communicatively coupled to an interface 910. The interface 910 is configured to receive an IP packet policy 915 having an IP address and attribute. The lookup unit 905 is configured to perform the procedure 800 of FIGS. 8A-C and procedures according to other embodiments.

Presented below are examples of searching for (or looking up) a policy that matches a packet according to the embodiments.

Using policy representations 500 and policy definitions 501 shown in FIG. 5, the following examples demonstrate how IP packets of Table 1 are processed to find matching policies.

TABLE 1

| Packet num | Src IP Address | Dest IP Addr | Src Port | Dest Port | Protocol |
|---|---|---|---|---|---|
| 1 | 192.168.1.56 | 192.168.23.55 | 22 | 22 | 6 |
| 2 | 192.168.1.56 | 192.168.23.55 | 22 | 22 | 36 |
| 3 | 192.168.1.56 | 192.168.23.55 | 44 | 22 | 36 |
| 4 | 10.56.7.8 | 192.168.23.55 | 23 | 23 | 33 |

Processing Packet 1:

1. Start at DSE 255.255.0.0 (505), search for a DIT matching destination IP address 192.168.23.55. Since the first 2 octets of DIT 192.168.1.1 (510) matches the first 2 octets of dest IP address of this packet, we have a match, so now consider the list of SSEs in this DIT (510)

2. In the SSE 255.255.255.0 (515) search for an SIT matching source address 192.168.1.56. Since the first 3 octets of SIT 192.168.1.112 (520) matches the first 3 octets of the source IP address of this packet, we have a match, so now consider the DSPT list in this SIT (520).

3. The DSPT list contains one entry that being the DSPT of type DPT (525). Since this is a DPT, we search the DPT (525) for the destination port contained in the IP packet, i.e. 22. This search succeeds, the DSPT DPT (525) found contains a list of DSPTs, we now consider this list of DSPTs.

4. The list of DSPTs has one entry that being the DSPT of type SPT (530). Since this is a SPT, we search the SPT (530) for the source port contained in the IP packet, i.e. 22. This search succeeds, the DSPT SPT found contains a list of DSPTs, we now consider this list of DSPTs.

5. The list of DSPT has 2 entries. A DSPT PT (535, 540, and 545), and a DSPT Priority Tree (550). We search both of these for the corresponding IP packet attribute defined by the DSPT type.

a. Search the DSPT PT (535, 540, and 545) for the IP packet protocol 6. This search succeeds resulting in a policy with priority 14.

b. Now consider the DSPT Priority Tree (550). This DSPT is not associated with any of the IP packet's attributes but exists because we have a policy indicating a don't care value for the protocol. So with this we search for the max priority which we find in one step. That being a policy with priority 9. Since this priority is lower than the priority of the policy found in a. we disregard this policy.

6. The resultant policy is that with priority 14.

Processing Packet 2:

This packet is the same as packet 1 except for the protocol field which is 36. So steps 1 through 4 are the same as above. Now consider step 5:

5. The list of DSPT has 2 entries. A DSPT PT (535, 540, and 545), and a DSPT Priority Tree (550). We search both of these for the corresponding IP packet attribute defined by the DSPT type.

a. Search the DSPT PT (535, 540, and 545) for the IP packet protocol 36. This search fails as there is no DSPT PT with protocol 36 in this PT (535, 540, and 545).

b. Now consider the DSPT Priority Tree (550). This DSPT is not associated with any of the IP packet's attributes but exists because we have a policy indicating a don't care value for the protocol. So with this we search for the max priority which we find in one step. That being a policy with priority 9. This is the only match.

6. The resultant policy is that with priority 9.

Processing Packet 3:

1. Start at DSE 255.255.0.0 (505), search for a DIT matching destination IP address 192.168.23.55. Since the first 2 octets of DIT 192.168.1.1 (510) matches the first 2 octets of dest IP address of this packet, we have a match, so now consider the list of SSEs in this DIT (510)

2. In the SSE 255.255.255.0 (515) search for an SIT matching source address 192.168.1.56. Since the first 3 octets of SIT 192.168.1.112 (520) matches the first 3 octets of the source IP address of this packet, we have a match, so now consider the DSPT list in this SIT (520).

3. The DSPT list contains one entry, that being the DSPT of type DPT (525). Since this is a DPT, we search the DPT (525) for the destination port contained in the IP packet, i.e. 22. This search succeeds, the DSPT DPT (525) found contains a list of DSPTs, we now consider this list of DSPTs.

4. The list of DSPTs has one entry, that being the DSPT of type SPT (530).

Since this is a SPT, we search the SPT (530) for the source port contained in the IP packet, i.e. 44. This search fails as there is no SPT containing source port 44.

5. Policy lookup found no matches.

Processing Packet 4:

1. Start at DSE 255.255.0.0 (510), search for a DIT matching destination IP address 192.168.23.55. Since the first 2 octets of DIT 192.168.1.1 (510) matches the first 2 octets of dest IP address of this packet, we have a match, so now consider the list of SSEs in this DIT (510).

2. In the SSE 255.255.255.0 (515) search for an SIT matching source address 10.56.7.8. Since the first 3 octets of SIT 192.168.1.112 (520) do not match the first 3 octets of the source IP address of this packet, we do not have a match. Since there are no other SSEs and no other DSEs the lookup ends.

3. Policy lookup found no matches.

Using policy representations 600 and policy definitions 601 shown in FIG. 6, the following examples demonstrate how IP packets of Table 2 are processed to find matching policies.

TABLE 2

| Packet num | Src IP Address | Dest IP Addr | Src Port | Dest Port | Protocol |
|---|---|---|---|---|---|
| 1 | 192.168.1.56 | 192.168.23.55 | 22 | 22 | 3 |
| 2 | 192.168.1.56 | 192.168.23.55 | 22 | 22 | 4 |
| 3 | 10.56.7.8 | 192.168.23.55 | 23 | 23 | 33 |

Processing Packet 1:

1. Start at DSE 255.255.0.0 (605), search for a DIT matching destination IP address 192.168.23.55. Since the first 2 octets of DIT 192.168.1.1 (610) matches the first 2 octets of dest IP address of this packet, we have a match, so now consider the list of SSEs in this DIT (610).

2. In the SSE 255.255.255.0 (615) search for an SIT matching source address 192.168.1.56. Since the first 3 octets of SIT 192.168.1.112 (620) matches the first 3 octets of the source IP address of this packet, we have a match, so now consider the DSPT list in this SIT (620).

3. The DSPT list contains one entry, that being the DSPT of type DPT (625). Since this is a DPT, we search the DPT (625) for the destination port contained in the IP packet, i.e. 22. This search succeeds, the DSPT DPT (625) found contains a list of DSPTs, we now consider this list of DSPTs.

4. The list of DSPTs has one entry, that being the DSPT of type SPT (630). Since this is a SPT, we search the SPT (630) for the source port contained in the IP packet, i.e. 22. This search succeeds, the DSPT SPT (630) found contains a list of DSPTs, we now consider this list of DSPTs.

5. The list of DSPT has 1 entry, that being the DSPT of type PT (635). since this is a PT we search the protocol contained in the IP packet, i.e. 3. This search succeeds resulting in a policy with priority 100. We have found a candidate policy.

6. Proceeding with the next SSE 255.255.255.252 (640), the max priority of this SSE is 80, which is less than the 100 we already found, so do not proceed with this SSE.

7. No more SSEs, so now proceed with the next DSE 255.0.0.0 (645).

8. The max priority in this DSE (645) is 50, which is less than the policy found so far so do not process this DSE (645).

9. The resultant policy is that with priority 100.

Processing Packet 2.

1. Start at DSE 255.255.0.0 (605), search for a DIT matching destination IP address 192.168.23.55. Since the first 2 octets of DIT 192.168.1.1 (610) matches the first 2 octets of dest IP address of this packet, we have a match, so now consider the list of SSEs in this DIT (610).

2. In the SSE 255.255.255.0 (615) search for an SIT matching source address 192.168.1.56. Since the first 3 octets of SIT 192.168.1.112 (620) matches the first 3 octets of the source IP address of this packet, we have a match, so now consider the DSPT list in this SIT.

3. The DSPT list contains one entry, that being the DSPT of type DPT (625). Since this is a DPT, we search the DPT (625) for the destination port contained in the IP packet, i.e. 22. This search succeeds, the DSPT DPT (625) found contains a list of DSPTs, we now consider this list of DSPTs.

4. The list of DSPTs has one entry, that being the DSPT of type SPT (630). Since this is a SPT, we search the SPT (630) for the source port contained in the IP packet, i.e. 22. This search succeeds, the DSPT SPT (630) found contains a list of DSPTs, we now consider this list of DSPTs.

5. The list of DSPT has 1 entry, that being the DSPT of type PT (635). since this is a PT we search the protocol contained in the IP packet, i.e. 4. This search fails.

6. Proceeding with the next SSE 255.255.255.252 (640), the SIT 192.168.1.112 (650) matches this packets source IP address (the first 30 bits of the IP address and SIT (650) are the same). So now consider the DSPT list in this SIT.

7. The DSPT list contains one entry, that being the DSPT of type SPT (655). Since this is a SPT, we search the SPT (655) for the source port contained in the IP packet, i.e. 22. This search succeeds, the DSPT SPT (655) found contains a list of DSPTs, we now consider this list of DSPTs.

8. The DSPT list contains one entry, that being the DSPT of type Priority Tree (660), the policy associated with this is priority 80. This is a match for this packet.

9. No more SSEs, so now proceed with the next DSE 255.0.0.0 (645).

10. The max priority in this DSE is 50, which is less than the policy found so far so do not process this DSE.

11. The resultant policy is that with priority 80.

Processing Packet 3.

1. Start at DSE 255.255.0.0 (605), search for a DIT matching destination IP address 192.168.23.55. Since the first 2 octets of DIT 192.168.1.1 (610) matches the first 2 octets of dest IP address of this packet, we have a match, so now consider the list of SSEs in this DIT (610).

2. In the SSE 255.255.255.0 (615) search for an SIT matching source address 10.56.7.8. Since the first 3 octets of SIT 192.168.1.112 (620) does not match the first 3 octets of the source IP address of this packet, we do not have a match. Proceed with the next SSE.

3. In the SSE 255.255.255.252 (640) search for an SIT matching source address 10.56.7.8. Since the first 3 octets of SIT 192.168.1.112 (650) does not match the first 3 octets of the source IP address of this packet, we do not have a match. Since there are no more SSEs, proceed with the next DSE.

4. With DSE 255.0.0.0 (645), search for a DIT matching destination IP address 192.168.23.55. Since the first octet of DIT 192.168.1.1 (665) matches the first octet of dest IP address of this packet, we have a match, so now consider the list of SSEs in this DIT (665).

5. In the SSE 255.0.0.0 (670) search for an SIT matching source address 10.56.7.8. Since the first octet of SIT 192.168.1.112 (675) does not match the first octet of the source IP address of this packet, we do not have a match. Since there are no more SSEs or DSEs, the search ends, with no matches.

6. Policy lookup found no matches.

Using policy representations 700 and policy definitions 701 shown in FIG. 7, the following examples demonstrate how IP packet of Table 3 are processed to find matching policies.

TABLE 3

| Packet num | Src IP Address | Dest IP Addr | Src Port | Dest Port | Protocol |
|---|---|---|---|---|---|
| 1 | 192.168.1.56 | 192.168.23.55 | 22 | 23 | 3 |

Processing Packet 1:

1. Start at DSE 255.255.0.0 (705), search for a DIT matching destination IP address 192.168.23.55. Since the first 2 octets of DIT 192.168.1.1 (710) matches the first 2 octets of dest IP address of this packet, we have a match, so now consider the list of SSEs in this DIT (710).

2. In the SSE 255.255.255.0 (715) search for an SIT matching IP packet source address 192.168.1.56. Since the first 3 octets of SIT 192.168.1.112 (720) matches the first 3 octets of the source IP address of this packet, we have a match, so now consider the DSPT list in this SIT (720).

3. The DSPT list contains 3 entries, those being the DSPTs of type SPT (725), DPT (735), and Priority Tree (755). Each is searched in turn for a matching policy with the highest priority.

a. Consider DSPT SPT (725), since this is a SPT, we search the SPT (725) for the source port contained in the IP packet, i.e. 22. This search succeeds, the DSPT SPT (725) found contains a list of DSPTs, we now consider this list of DSPTs.

b. The list of DSPTs has one entry, that being the DSPT of type PT (730). Since this is a PT, we search the PT (730) for the protocol contained in the IP packet, i.e. 3. This search succeeds, the associated policy has priority 100. Now proceed with DSPT of type DPT (735) in step 3.

c. DSPT DPT (735) in step 3 contains a list of DSPTs, we now consider this list of DSPTs.

d. The list of DSPT has 2 entries, that being the DSPT of type PT (750), and DSPT of type SPT (740).

i. The PT (750) value of 4 does not match the IP packet's protocol and is ignored.

ii. We proceed with the DSPT of type SPT (740), search for a match with IP packet source port 22 which is found containing policy of priority 90. This is lower than the priority found previously.

iii. We have exhausted the DSPTs in the DPT 23 (735).

e. Finally we search DSPT in SIT's list of type Priority Tree (755). This has a policy of priority 50 which is lower than the priority found previously and is ignored.

4. Since there are no other SITs or DITs the lookup completes.

5. The resultant policy is that with priority 100.

The example embodiments described above minimize the number of comparisons for finding a policy that matches the 5-tuple of an IP packet under consideration. As such, these embodiments reduce the time to search a collection of policies for a policy matching the 5-tuple or "search time."

For example, in operation, when attributes of the 5-tuple of an IP packet under consideration do not compare with policy selectors, one embodiment avoids further comparison of policy selectors represented by one or more elements of the policy storage structure (e.g., DSE) with the IP packet 5-tuple, thereby, reducing the number of comparisons to find a policy describing the disposition of the IP packet.

According to another embodiment, by incorporating a highest policy priority in a DSE, for example, a search of that DSE (and its sub-elements) for a matching policy is terminated "early" (e.g., without searching the DSE) when a policy found so far has higher priority than any policy represented by that DSE (and its sub-elements).

A convenient embodiment organizes DIT, SIT, DPT, SPT, and/or PT as a balanced binary tree. When searching the DIT for a policy, for example, each comparison of a destination IP address of the IP packet with a DIT node halves the number of DIT nodes to be compared.

According to yet another embodiment, as with a DSE, a SSE also incorporates a highest priority information (e.g., in a field) that tracks the highest priority value of all policies contained in (or represented by) the SSE. With this information, a search procedure according to one embodiment compares the priority of the "best" policy found so far (e.g., in terms of a number of matching selectors found) with the highest priority contained in the SSE under consideration. If the priority of a policy already found is equal to or higher than the highest priority contained in the SSE, the SSE (and sub-elements) need not be searched. This offers a significant improvement in search time.

According to still yet another embodiment, the search time is proportional to log n, where n is the number of policies including policies with overlapping policy selectors in addition to policies incorporating "don't care" selector values (e.g., selector value of 0).

One or more of the foregoing embodiments provide significant advantages to approaches involving a linear search, avoids complex hash calculations with overlapping policy complications, and extends the usability of a given network security platform without necessarily having to incorporate a Ternary Content Addressable Memory or TCAM (which is costly and limited in the number of policies that can be searched at one time) to gain significant performance improvement.

As described above, the example embodiments may be implemented by a packet processing device of a network, such as the packet processing device 300 of FIG. 3 and the packet processing device 900 of FIG. 9. Alternatively, the example embodiments may be implemented by a general purpose computer having a processor, memory, communication interface, etc (described in greater detail below in reference to FIG. 10). The general purpose computer is transformed into the packet processing device, for example, by loading instructions into the processor that cause the computer to represent a policy when given policy selectors and search for a policy matching a packet, as previously described.

Figure 10:
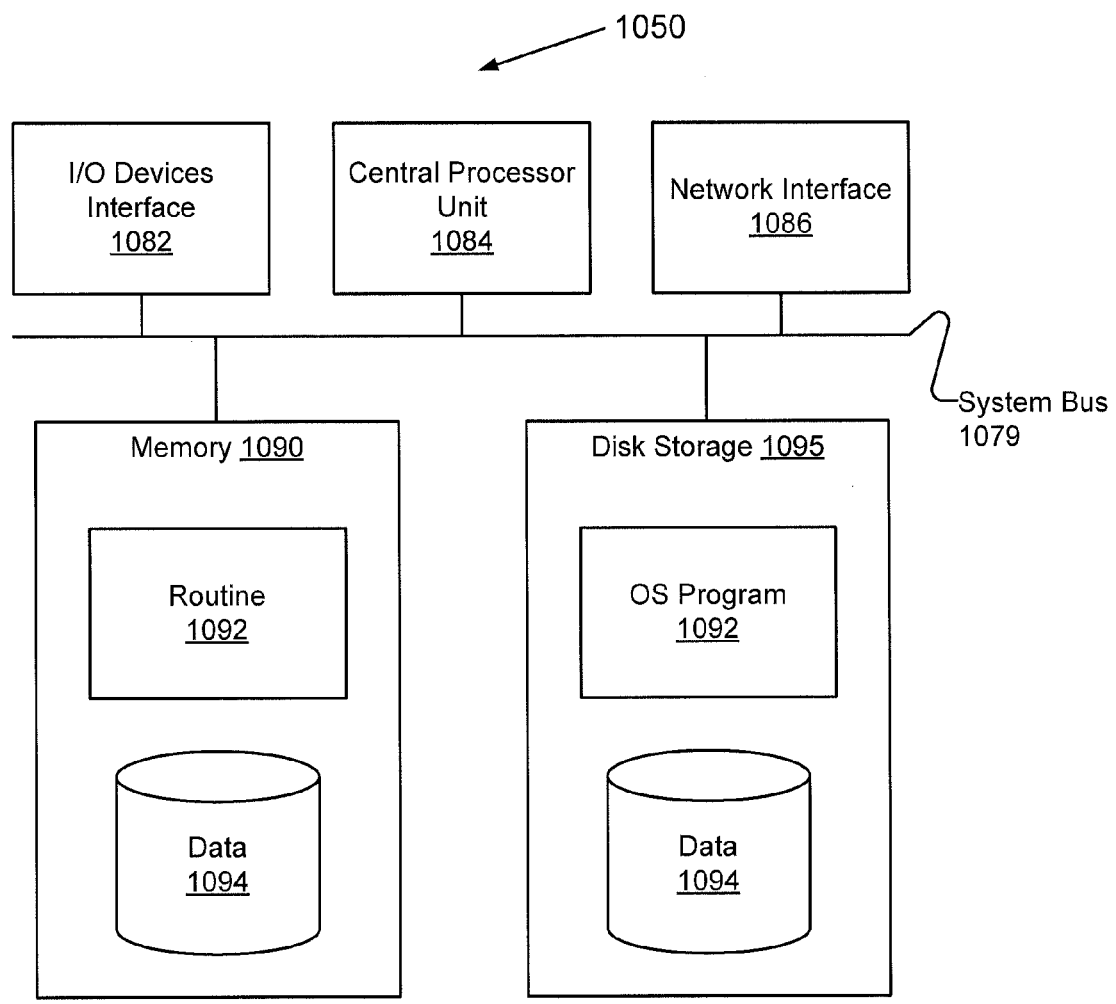
FIG. 10 is a block diagram of an example computer to implement the embodiments.

FIG. 10 is a block diagram of the internal structure of a computer 1050 in which various embodiments of the procedures (200 and 800) and policy storage structure (400, etc. . . . ) may be implemented. The computer 1050 contains system bus 1079, where a bus is a set of hardware lines used for data transfer among the components of a computer or processing system. Bus 1079 is essentially a shared conduit that connects different elements of a computer system (e.g., processor, disk storage, memory, input/output ports, network ports, etc.) that enables the transfer of information between the elements. Attached to system bus 1079 is I/O device interface 1082 for connecting various input and output devices (e.g., keyboard, mouse, displays, printers, speakers, etc.) to the computer 1050. Network interface 1086 allows the computer 1050 to connect to various other devices attached to a network (e.g., network 100 of FIG. 1). Memory 1090 provides volatile storage for computer software instructions 1092 and data 1094 used to implement an embodiment. Disk storage 1095 provides non-volatile storage for computer software instructions 1092 and data 1094 used to implement, for example, the procedure 200 of FIG. 2 and the procedure 800 of FIG. 8. Central processor unit 1084 is also attached to system bus 1079 and provides for the execution of computer instructions.

In one embodiment, the processor routines 1092 and data 1094 are a computer program product (generally referenced 1092), including a computer readable medium (e.g., a removable storage medium such as one or more DVD-ROM's, CD-ROM's, diskettes, tapes, etc.) that provides at least a portion of the software instructions for the system. Computer program product 1092 can be installed by any suitable software installation procedure, as is well known in the art. In another embodiment, at least a portion of the software instructions may also be downloaded over a cable, communication and/or wireless connection.

Further, embodiments may be implemented in a variety of computer architectures. The computer of FIG. 10 is for purposes of illustration and not limitation of the embodiments.

Embodiments may be implemented in hardware, firmware, software, or any combination thereof. Embodiments may also be implemented as instructions stored on a non-transient machine-readable medium, which may be read and executed by one or more procedures. A non-transient machine-readable medium may include any mechanism for storing or transmitting information in a form readable by a machine (e.g., a computing device). For example, a non-transient machine-readable medium may include read only memory (ROM); random access memory (RAM); magnetic disk storage media; optical storage media; flash memory devices; and others. Further, firmware, software, routines, or instructions may be described herein as performing certain actions. However, it should be appreciated that such descriptions are merely for convenience and that such actions in fact result from computing devices, processors, controllers, or other devices executing the firmware, software, routines, instructions, etc.

It should be understood that the block and network diagrams may include more or fewer elements, be arranged differently, or be represented differently. It should be understood that implementation may dictate the block and network diagrams and the number of block and network diagrams illustrating the execution of the embodiments.

What is claimed is:

1. A method comprising;
   in a packet processing device of a network, receiving a policy with policy selectors and a priority:
   upon determining that a subnet mask in a policy selector is not contained in a subnet element (SE) node within a list of SE nodes, creating a Subnet Element (SE) node that stores the subnet mask and a reference to another SE node and adding the SE node created to the list of SE nodes;
   upon determining that the priority of the policy is greater than a priority value recorded in a SE node storing the subnet mask, recording the priority of the policy in the SE node storing the subnet mask;
   upon determining that an internet protocol (IP) address in the policy selector is not stored in any IP address tree (IT) node associated with the SE node storing the subnet mask, creating an IP address Tree (IT) node that stores the IP address and a reference to another IT node and storing the memory address of the IT node created in the SE node storing the subnet mask or in another IT node associated with the SE node storing the subnet mask;
   upon determining that a value of an attribute in the policy selector is nonzero and is not stored in any Attribute Tree (AT) node associated with an IT node storing the IP address in the policy selector, creating an Attribute Tree (AT) node that stores the nonzero value of the attribute in the policy selector and a reference to another AT node then storing the memory address of the AT node created in the IT node storing the IP address, or in an AT node associated with the IT node storing the IP address; and
   upon determining that the value of the attribute in the policy selector is zero, indicating "don't care" about the attribute in the policy selector when searching for a matching policy, and that the attribute in the policy selector is the last one to be processed of a set of attributes in the policy selector, all equal to zero, creating a priority node that stores the memory address of the policy and the priority of the policy, and storing the memory address of the priority node in the IT node storing the IP address, or in an AT node associated with the IT node storing the IP address.

2. The method of claim 1 wherein determining that the IP address in the policy selector is not stored in any IT node associated with the SE node storing the subnet mask comprises searching a tree of IT nodes for the IP address, the memory address of the root node of the tree is stored in the SE node storing the subnet mask, and wherein storing the IT node in another IT node associated with the SE node storing the subnet mask includes adding the IT node to the tree if another IT node storing the destination IP address is not found.

3. The method of claim 2 wherein the tree of IT nodes is a binary tree; and wherein adding the IT node includes balancing the tree.

4. The method of claim 1 wherein determining that the value of the attribute in the policy selector is not stored in any AT node associated with the IT node storing the IP address comprises searching a tree of AT nodes for the attribute, the memory address of the root node of the tree is stored in the IT node storing the IP address; and wherein storing the memory address of the AT node created in an AT node associated with the IT node storing the IP address includes adding the AT node created to the tree if another AT node storing the attribute is not found.

5. The method of claim 1 further comprising determining if the subnet mask in the policy selector is a destination subnet mask;
   wherein creating the SE includes creating a Destination Subnet Element (DSE) that stores the destination subnet mask and a reference of another DSE; and
   wherein recording the priority of the policy includes recording the priority of the policy in the DSE.

6. The method of claim 1 further comprising determining if the subnet mask in the policy selector is a source subnet mask;
   wherein creating the SE includes creating a Source Subnet Element (SSE) that stores the source subnet mask and a reference of another SSE, and
   wherein recording the priority of the policy includes recording the priority of the policy in the SSE.

7. The method of claim 1 further comprising determining if the IP address in the policy selector is a destination IP address; and
   wherein creating the IT node includes creating a Destination IP address Tree (DIT) node that stores the destination IP address and a reference of another DIT node.

8. The method of claim 1 further comprising determining if the IP address in the policy selector is a source IP address; and
   wherein creating the IT node includes creating a Source IP address Tree (SIT) node that stores the source IP address and a reference of another SIT node.

9. The method of claim 1 further comprising:
   determining if attribute in the policy selector is a destination port, source port or protocol; and
   setting the AT node to type Destination Port Tree (DPT), Source Port Tree (SPT) or Protocol Tree (PT) based on the determination.

10. An apparatus comprising;
   an interface to receive a policy with a policy selector and a priority,
   a policy representing unit, communicatively coupled to the interface, the policy representing unit configured to:
   upon determining that a subnet mask in the policy selector is not contained in a Subnet Element (SE) node within a list of SE nodes, create a Subnet Element (SE) node that stores the subnet mask and a reference of another SE;
   if the priority of the policy is greater than a priority of another policy recorded in a SE node storing the subnet mask, then record the priority of the policy in the SE node storing the subnet mask;

upon determining that an IP address in the policy selector is not stored in any IP address Tree (IT) node associated with the SE node storing the subnet mask, create an IP address Tree (IT) node that stores the IP address and a reference of another IT node and store the memory address of the IT node in the SE node storing the subnet mask or in an IT node associated with the SE node storing the subnet mask;

upon determining that a value of an attribute in the policy selector is nonzero and is not stored in any Attribute Tree (AT) node associated with an IT node storing the IP address in the policy selector, create an Attribute Tree (AT) node that stores the nonzero value of the attribute in the policy selector and a reference of another AT node and store the memory address of the AT node created in the IT node storing the IP address or in another AT node associated with the IT node storing the IP address;

Upon determining that the value of the attribute in the policy selector is zero, indicating "don't care" about that attribute in the policy selector when searching for a matching policy, and the attribute in the policy selector is the last one to be processed of a set of attributes in the policy selector, all equal to zero, create a priority node that stores the memory address of the policy and the priority of the policy and store the memory address of the priority node in the IT node storing the IP address or in an AT node associated with the IT node storing the IP address.

11. The method of claim 1, wherein the SE node storing the subnet mask is the SE node created or a SE node, within the list of SE nodes, determined to be storing the subnet mask in the policy selector, and the IT node storing the IP address is the IT node created or an IT node determined to be storing the IP address in the policy selector.

12. The method of claim 1, wherein the AT node created further stores a reference to the policy.

13. The apparatus of claim 10, wherein the SE node storing the subnet mask is the SE node created or a SE node, within the list of SE nodes, determined to be storing the subnet mask in the policy selector, and the IT node storing the IP address is the IT node created or an IT node determined to be storing the IP address in the policy selector.

* * * * *